US012340663B2

(12) United States Patent
Sanborn et al.

(10) Patent No.: US 12,340,663 B2
(45) **Date of Patent: *Jun. 24, 2025**

(54) SYSTEMS AND METHODS FOR PROVIDING A PATTERN MULTIPLIER FEATURE GAME

(71) Applicant: Aristocrat Technologies, Inc., Las Vegas, NV (US)

(72) Inventors: Hanna Sanborn, Georgetown, TX (US); Chad La Guardia, Austin, TX (US); Erick Ching, Cedar Park, TX (US); Rogelio Decasa, Jr., Renton, WA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,438

(22) Filed: May 21, 2024

(65) Prior Publication Data

US 2024/0304065 A1 Sep. 12, 2024

Related U.S. Application Data

(63) Continuation of application No. 18/335,514, filed on Jun. 15, 2023, now Pat. No. 12,027,019, which is a (Continued)

(51) Int. Cl.
*G07F 17/32* (2006.01)
*G06Q 50/34* (2012.01)

(52) U.S. Cl.
CPC ......... *G07F 17/3267* (2013.01); *G06Q 50/34* (2013.01); *G07F 17/3211* (2013.01); *G07F 17/3258* (2013.01); *G07F 17/326* (2013.01)

(58) Field of Classification Search
None
See application file for complete search history.

(56) References Cited

U.S. PATENT DOCUMENTS

D92,289 S 5/1934 Michael
D127,516 S 5/1941 Michael (Continued)

OTHER PUBLICATIONS

Notice of Allowance dated Dec. 9, 2020 for U.S. Appl. No. 16/773,504 (pp. 1-10).

(Continued)

*Primary Examiner* — Jason T Yen
(74) *Attorney, Agent, or Firm* — Armstrong Teasdale LLP

(57) ABSTRACT

An electronic gaming machine includes a game controller configured to (a) determine, during a base game, that a feature game trigger condition is satisfied; (b) activate a feature game within the base game; (c) display, a feature game play area associated with the feature game, the feature game play area including a plurality of zone patterns overlaid on the symbol display positions; (d) convert the symbol display positions into independent feature game reels; (e) generate a first game outcome by (i) holding a first set of feature game reels displaying the prize symbols while (ii) selecting and displaying a symbol for a second set of feature game reels; (f) determine that at least one zone pattern is complete with prize symbols; (g) apply a zone multiplier associated with the zone pattern to credit values within the zone pattern; and (h) award the incremented credit values to the player.

20 Claims, 20 Drawing Sheets

Related U.S. Application Data continuation of application No. 17/725,355, filed on Apr. 20, 2022, now Pat. No. 11,715,351, which is a continuation of application No. 17/149,442, filed on Jan. 14, 2021, now Pat. No. 11,328,558, which is a continuation of application No. 16/773,504, filed on Jan. 27, 2020, now Pat. No. 10,902,702, which is a continuation-in-part of application No. 29/716,520, filed on Dec. 10, 2019, now Pat. No. Des. 999,774.

(60) Provisional application No. 62/888,802, filed on Aug. 19, 2019.

(56) References Cited

U.S. PATENT DOCUMENTS

| | | | | |
|---|---|---|---|---|
| D164,688 | S | 10/1951 | Jimenez | |
| 4,428,732 | A | 1/1984 | Meyer | |
| D450,323 | S | 11/2001 | Moore | |
| D450,324 | S | 11/2001 | Istvan | |
| D470,152 | S | 2/2003 | Witus | |
| D517,060 | S | 3/2006 | Tyner, Jr. | |
| D542,804 | S | 5/2007 | Sadler | |
| D549,714 | S | 8/2007 | Sharma | |
| D631,892 | S | 2/2011 | Kim | |
| D632,698 | S | 2/2011 | Judy | |
| D642,195 | S | 7/2011 | Marks | |
| D649,556 | S | 11/2011 | Judy | |
| D663,741 | S | 7/2012 | Cielak | |
| D669,914 | S | 10/2012 | Evans | |
| D682,854 | S | 5/2013 | Kanalakis, Jr. | |
| D709,098 | S | 7/2014 | Kobayashi | |
| D710,897 | S | 8/2014 | Hollobaugh | |
| D725,128 | S | 3/2015 | Aoshima | |
| D732,067 | S | 6/2015 | Kang | |
| D749,604 | S | 2/2016 | Trousdell | |
| D750,644 | S | 3/2016 | Bhutani | |
| D756,375 | S | 5/2016 | Aihara | |
| D764,483 | S | 8/2016 | Heinrich | |
| D768,672 | S | 10/2016 | Chang | |
| D779,536 | S | 2/2017 | Wingate-Whyte | |
| D783,096 | S | 4/2017 | Aoki | |
| D783,654 | S | 4/2017 | Hu | |
| D785,645 | S | 5/2017 | Lam | |
| D793,409 | S | 8/2017 | Berman | |
| D809,540 | S | 2/2018 | Vedrody | |
| D810,761 | S | 2/2018 | Apodaca | |
| D816,680 | S | 5/2018 | Cipriano | |
| D816,699 | S | 5/2018 | Ledford | |
| D829,755 | S | 10/2018 | Atkinson | |
| D839,285 | S | 1/2019 | Cerna-Madrid | |
| D848,457 | S | 5/2019 | Foley | |
| D852,830 | S | 7/2019 | Penacho | |
| D879,114 | S | 3/2020 | Alvarez | |
| D915,433 | S | 4/2021 | Lamontagne | |
| 2005/0288087 | A1 | 12/2005 | Meyer | |
| 2008/0161081 | A1 | 7/2008 | Berman | |
| 2008/0176634 | A1 | 7/2008 | Berman | |
| 2010/0216540 | A1* | 8/2010 | Berman | G07F 17/3286 463/20 |
| 2010/0317425 | A1 | 12/2010 | Gomez | |
| 2012/0088567 | A1 | 4/2012 | Aoki | |
| 2013/0137500 | A1 | 5/2013 | Kelly | |
| 2014/0274292 | A1* | 9/2014 | Suda | G07F 17/34 463/20 |
| 2016/0253875 | A1 | 9/2016 | Kitamura | |
| 2016/0358412 | A1 | 12/2016 | Eaton | |
| 2016/0364948 | A1* | 12/2016 | Parviainen | G07F 17/3246 |
| 2018/0075702 | A1* | 3/2018 | Wright | G07F 17/3267 |
| 2019/0073860 | A1 | 3/2019 | Reynolds | |

OTHER PUBLICATIONS

Office Action (Non-Final Rejection) dated Jan. 3, 2022 for U.S. Appl. No. 17/149,442 (pp. 1-6).
Uhttps://www.iconfinder.com/icons/1217425/abstract_block_letter_shape_tetris_icon (Year 2016).
https://www.iconfinder.com/icons/233933/fun_tetris_game_line_icon (Year: 2013).
https://www.iconfinder.com/icons/3991883/business_creation_formationgeneration jigsaw_puzzle tetris io (Year: 2018).
Trademark U.S. Appl. No. 74/515,113 (Year: 1994).
Trademark U.S. Appl. No. 87/172,353 (Year: 2016).
Trademark U.S. Appl. No. 87/172,454 (Year: 2016).
Trademark U.S. Appl. No. 77/126,764 (Year: 2007).
Office Action dated Feb. 16, 2022 for U.S. Appl. No. 29/716,520 (pp. 1-8).
Office Action (Notice of Allowance and Fees Due (PTOL-85)) dated Mar. 3, 2022 for U.S. Appl. No. 17/149,442 (pp. 1-9).
Office Action dated Aug. 04, 2022 for U.S. Appl. No. 29/716,520 (pp. 1-6).
Office Action (Non-Final Rejection) dated Dec. 19, 2022 for U.S. Appl. No. 17/725,355 (pp. 1-10).
Office Action dated Feb. 24, 2023 for U.S. Appl. No. 29/716,520 (pp. 1-8).
Office Action (Notice of Allowance and Fees Due (PTOL-85)) dated Mar. 22, 2023 for U.S. Appl. No. 17/725,355 (pp. 1-9).
Notice of Allowance dated May 26, 2023 for U.S. Appl. No. 29/716,520 (pp. 1-5).
International Search Report and Written Opinion issued in PCT/US2020/028789, dated Jul. 2, 2020, 14 pages.
Office Action (Non-Final Rejection) dated Jan. 9, 2024 for U.S. Appl. No. 18/335,514 (pp. 1-6).
Notice of Allowance dated Mar. 29, 2024 for U.S. Appl. No. 18/335,514 (pp. 1-8).
Australian Examination Report No. 1 issued in App. No. AU2020333434 dated Apr. 15, 2025, 3 pages.

* cited by examiner

Zone Multiplier Table

Bet 1

| Pattern # | Multiplier Values per reel: Zone1 | Zone2 | Zone3 | Zone4 | Weight |
|---|---|---|---|---|---|
| 1 | 2 | 2 | 2 | 2 | 1 |
| 2 | 2 | 2 | 2 | 2 | 1 |
| 3 | 2 | 2 | 2 | 2 | 1 |
| 4 | 2 | 2 | 2 | 2 | 1 |
| 5 | 2 | 2 | 2 | 2 | 1 |
| 6 | 2 | 2 | 2 | 2 | 1 |
| 7 | 2 | 2 | 2 | 2 | 1 |
| | | | | | 7 |

FIG. 8A

Bet 2

| Pattern # | Multiplier Values per reel: Zone1 | Zone2 | Zone3 | Zone4 | Weight |
|---|---|---|---|---|---|
| 1 | 2 | 3 | 2 | 2 | 1 |
| 2 | 3 | 2 | 2 | 2 | 1 |
| 3 | 2 | 3 | 3 | 2 | 1 |
| 4 | 3 | 2 | 2 | 3 | 1 |
| 5 | 3 | 2 | 3 | 2 | 1 |
| 6 | 2 | 3 | 3 | 3 | 1 |
| 7 | 3 | 3 | 3 | 3 | 1 |
| | | | | | 7 |

FIG. 8B

Bet 3

| Pattern # | Multiplier Values per reel: Zone1 | Zone2 | Zone3 | Zone4 | Weight |
|---|---|---|---|---|---|
| 1 | 2 | 4 | 2 | 2 | 1 |
| 2 | 4 | 2 | 2 | 2 | 1 |
| 3 | 2 | 4 | 3 | 2 | 1 |
| 4 | 4 | 2 | 4 | 3 | 1 |
| 5 | 3 | 2 | 4 | 4 | 1 |
| 6 | 4 | 3 | 3 | 4 | 1 |
| 7 | 4 | 4 | 4 | 4 | 1 |
| | | | | | 7 |

FIG. 8C

Bet 4

| Pattern # | Multiplier Values per reel: Zone1 | Zone2 | Zone3 | Zone4 | Weight |
|---|---|---|---|---|---|
| 1 | 2 | 5 | 2 | 2 | 1 |
| 2 | 3 | 2 | 4 | 2 | 1 |
| 3 | 2 | 5 | 4 | 2 | 1 |
| 4 | 4 | 2 | 4 | 5 | 1 |
| 5 | 3 | 2 | 4 | 5 | 1 |
| 6 | 5 | 3 | 3 | 4 | 1 |
| 7 | 5 | 5 | 5 | 5 | 1 |
| | | | | | 7 |

FIG. 8D

SYSTEMS AND METHODS FOR PROVIDING A PATTERN MULTIPLIER FEATURE GAME

CROSS REFERENCE TO RELATED APPLICATIONS

This application is a continuation of and claims priority to U.S. patent application Ser. No. 18/335,514, filed Jun. 15, 2023, which is a continuation of U.S. patent application Ser. No. 17/725,355, now U.S. Pat. No. 11,715,351, filed Apr. 20, 2022, which is a continuation of U.S. patent application Ser. No. 17/149,442, now U.S. Pat. No. 11,328,558, filed Jan. 14, 2021, which is a continuation of U.S. patent application Ser. No. 16/773,504, now U.S. Pat. No. 10,902,702, filed Jan. 27, 2020, which claims priority to U.S. Provisional Patent Application No. 62/888,802, filed Aug. 19, 2019, and is a continuation in part of United States Design Application No. 29/716,520, filed Dec. 10, 2019, each of which is hereby incorporated herein by reference in its entirety.

TECHNICAL FIELD

The field of disclosure relates generally to electronic gaming, and more particularly, to systems and methods for providing a multiplier feature game on an electronic gaming device.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol display positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to include differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

BRIEF DESCRIPTION

In one aspect, an electronic gaming machine is provided. The electronic gaming machine includes at least one display, a player input interface configured to receive a player input, a credit input mechanism, and a game controller. The credit input mechanism includes at least one of a card reader, a ticket reader, a bill acceptor, and a coin input mechanism. The credit input mechanism is configured to receive a credit wager. The game controller is configured to execute instructions stored in a tangible, non-transitory, computer-readable storage medium, which, when executed by the game controller cause the game controller to determine, during a base game initiated in response to receiving the credit wager, that a feature game trigger condition is satisfied. The feature game trigger condition occurs when a certain number of prize symbols are displayed at a plurality of symbol display positions. The instructions also cause the game controller to activate, in response to the feature game trigger condition, a feature game within the base game. The instructions also cause the game controller to display, on the at least one display device and in response to activating the feature game, a feature game play area associated with the feature game.

The feature game play area includes the prize symbols and a plurality of zone patterns overlaid on the plurality of symbol display positions. The instructions also cause the game controller to convert, in response to activating the feature game, the plurality of symbol display positions of the base game into a plurality of independent feature game reels. The instructions also cause the game controller to generate a first game outcome by (i) holding a first set of feature game reels of the plurality of feature game reels, the first set of feature game reels displaying the prize symbols while (ii) selecting and displaying a symbol for a second set of feature game reels of the plurality of feature game reels, the second set including the remaining feature game reels. The instructions also cause the game controller to determine that at least one of the plurality of zone patterns is complete with prize symbols. The instructions also cause the game controller to apply a zone multiplier associated with the at least one zone pattern of the plurality of zone patterns to one or more credit values within the at least one zone pattern. The credit values are associated with the prize symbols. The instructions also cause the game controller to award the incremented one or more credit values to the player.

In another aspect, a computer-implemented method is provided. The method is implemented on an electronic gaming machine. The electronic gaming machine includes at least one display device, a player input interface, a game controller, and a credit input mechanism. The credit input mechanism includes at least one of a card reader, a ticket reader, a bill acceptor, and a coin input mechanism. The method includes determining, during a base game initiated in response to receiving the credit wager, that a feature game trigger condition is satisfied. The feature game trigger condition occurs when a certain number of prize symbols are displayed at a plurality of symbol display positions. The method also includes activating, in response to the feature game trigger condition, a feature game within the base game. The method also includes displaying, on the at least one display device and in response to activating the feature game, a feature game play area associated with the feature game. The feature game play area includes the prize symbols and a plurality of zone patterns overlaid on the plurality of symbol display positions.

The method also includes generating a first game outcome by (i) holding a first set of feature game reels of the plurality of feature game reels, the first set displaying the prize symbols while (ii) selecting and displaying a symbol for a second set of feature game reels of the plurality of feature game reels. The second set includes the remaining feature game reels. The method also includes determining that at least one of the plurality of zone patterns is complete with prize symbols. The method also includes applying a zone multiplier associated with the at least one zone pattern of the plurality of zone patterns to one or more credit values within the at least one zone pattern. The credit values are associated with the prize symbols. The method also includes awarding the incremented one or more credit values to the player.

In yet another aspect, a gaming system is provided. The gaming system includes at least one gaming device. The at least one gaming device includes at least one display device. The gaming system also includes a server system communicatively coupled to the at least one gaming device. The server system includes a processor configured to execute instructions stored on a tangible, non-transitory, computer-readable storage medium. When executed by the processor, the instructions cause the processor to determine, during a base game initiated in response to receiving the credit wager, that a feature game trigger condition is satisfied. The feature game trigger condition occurs when a certain number of prize symbols are displayed at a plurality of symbol display positions. The instructions also cause the processor to activate, in response to the feature game trigger condition, a feature game within the base game. The instructions also cause the processor to display, on the at least one display device and in response to activating the feature game, a feature game play area associated with the feature game. The feature game play area includes the prize symbols and a plurality of zone patterns overlaid on the plurality of symbol display positions.

The instructions also cause the processor to convert, in response to activating the feature game, the plurality of symbol display positions of the base game into a plurality of independent feature game reels. The instructions also cause the processor to generate a first game outcome by (i) holding a first set of feature game reels of the plurality of feature game reels, the first set displaying the prize symbols while (ii) selecting and displaying a symbol for a second set of feature game reels of the plurality of feature game reels. The second set includes the remaining feature game reels. The instructions also cause the processor to determine that at least one of the plurality of zone patterns is complete with prize symbols. The instructions also cause the processor to apply a zone multiplier associated with the at least one zone pattern of the plurality of zone patterns to one or more credit values within the at least one zone pattern. The credit values are associated with the prize symbols. The instructions also cause the processor to award the incremented one or more credit values to the player.

BRIEF DESCRIPTION OF THE DRAWINGS

An example embodiment of the subject matter disclosed will now be described with reference to the accompanying drawings.

FIGS. 8A-8D illustrate example lookup tables to be used by an RNG conversion engine to determine multiplier values for a plurality of zone patterns in accordance with the present disclosure;

DETAILED DESCRIPTION

Embodiments of the present disclosure provide systems and methods for providing a feature game within the base game. An electronic gaming machine provides a base game with a feature game that may be triggered within the base game. The electronic gaming machine is configured to present the feature game in response to a feature game trigger condition. The feature game may be activated when a certain number of prize symbols are displayed on a game play area during play of the base game. In response to activating the feature game, the electronic gaming machine displays a plurality of geometric zone patterns (e.g., zones) overlaid on the symbol display positions of the base game reels to define a feature game play area. Further, the individual symbol display positions are converted into independent feature game reels that spin and stop during play of the feature game. In the example embodiment, the feature game reels displaying the prize symbols are held (e.g., locked) in place while the remaining feature game reels are spun to display either prize symbols or non-prize symbols.

In the example embodiment, zone multipliers are associated with the plurality of geometric zone patterns. With each spin, prize symbols accumulate within the zone patterns. During play of the feature game, when zone patterns are complete with prize symbols, an associated zone multiplier (e.g., 2×, 3×, 4×, and 5×) is applied to each credit value within the zone pattern. Credit values are associated with the prize symbols. Zone multipliers may not apply to prize symbols having a jackpot value (e.g., grand, major, minor, mini). If a player does not complete (e.g., fill) a zone pattern with prize symbols, the corresponding zone multiplier is not applied to the one or more credit values within the zone pattern, and the player is awarded only the one or more credit values (with no zone multiplier applied). In the example embodiment, a player is awarded a number of free plays of the feature game. Any prize symbol that appears during play of the feature game is locked in place such that a player's chance of completing one or more zone patterns increases before the feature game ends. A player's excitement in the game is heightened as prize symbols accumulate within the zone patterns during gameplay because in addition to winning the credit values displayed by the accumulated prize symbols, the player is also given a chance to multiply their winnings with the zone multipliers.

Figure 1:
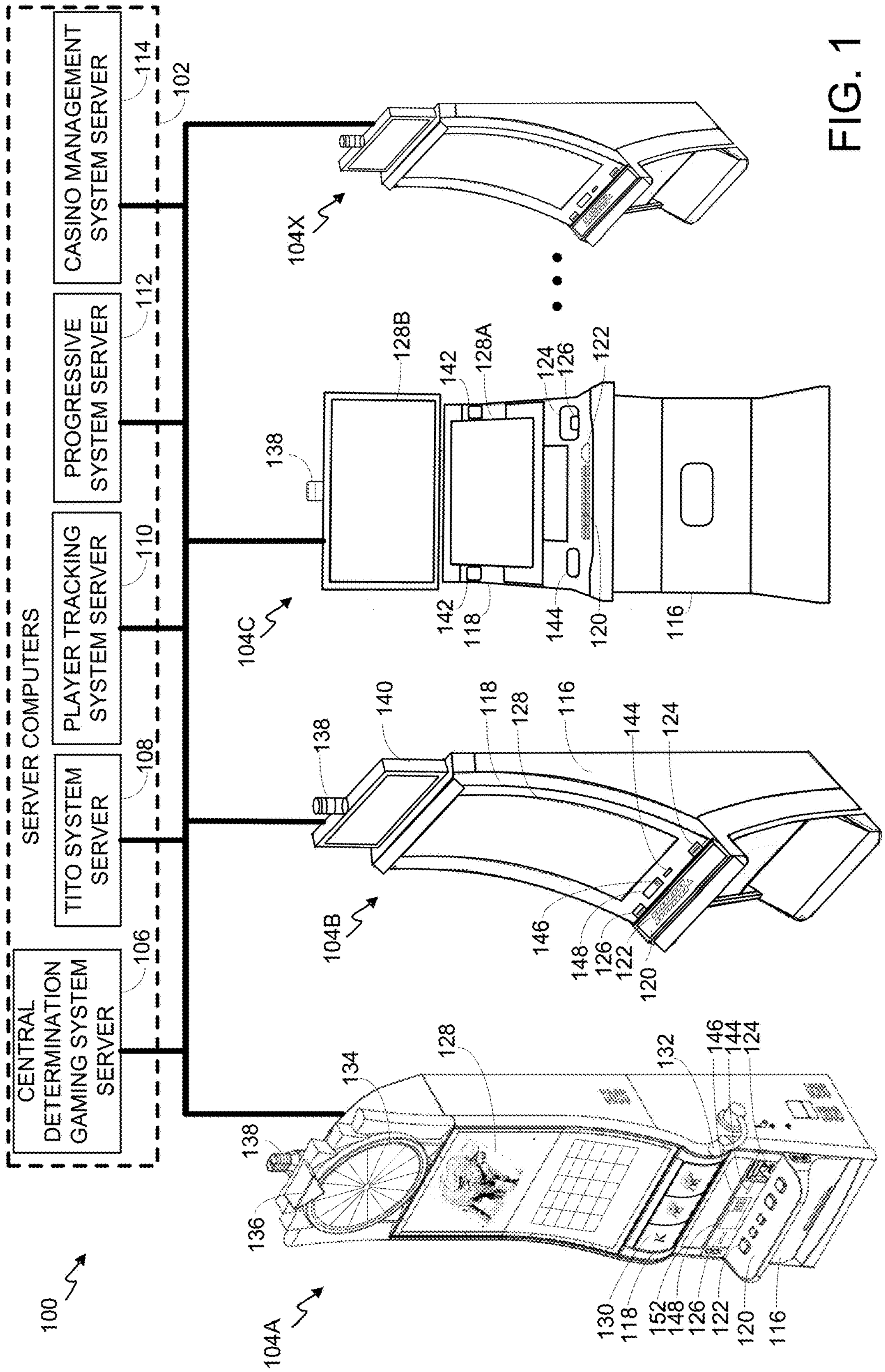
FIG. 1 is a schematic diagram of a plurality of electronic gaming devices (EGMs) networked with various gaming-related servers in accordance with the present disclosure.

FIG. 1 illustrates several different models of EGMs which may be networked to various gaming related servers in accordance with the present disclosure. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
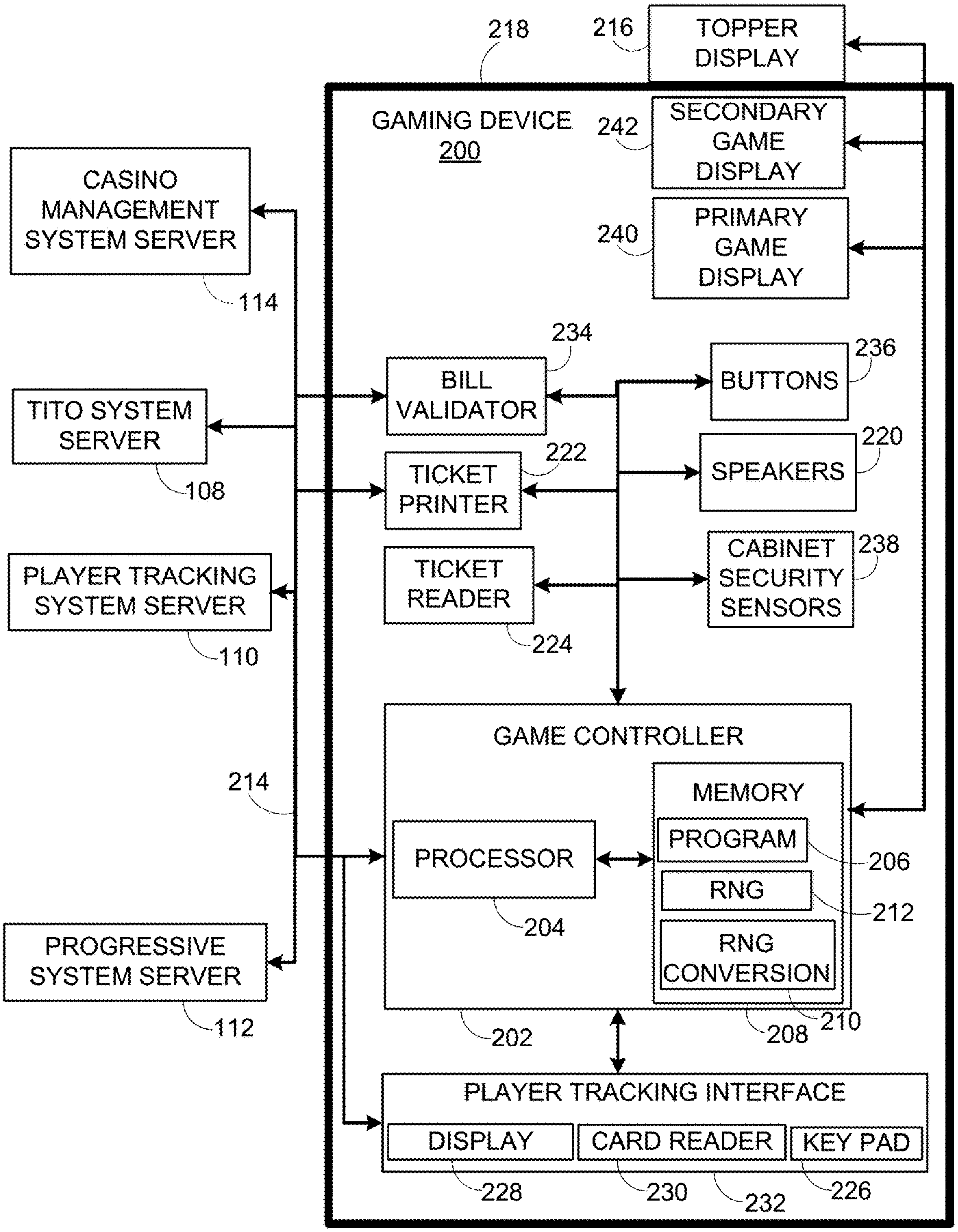
FIG. 2A is a block diagram of an example EGM that includes exemplary internal electronic components, and connections to exemplary gaming systems in accordance with the present disclosure.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems in accordance with the present disclosure. All or parts of the example gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2A illustrate specific embodiments of a gaming device (e.g., gaming devices 104A-104X and 200), the disclosure is not limited to those embodiments shown in FIGS. 1 and 2A. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
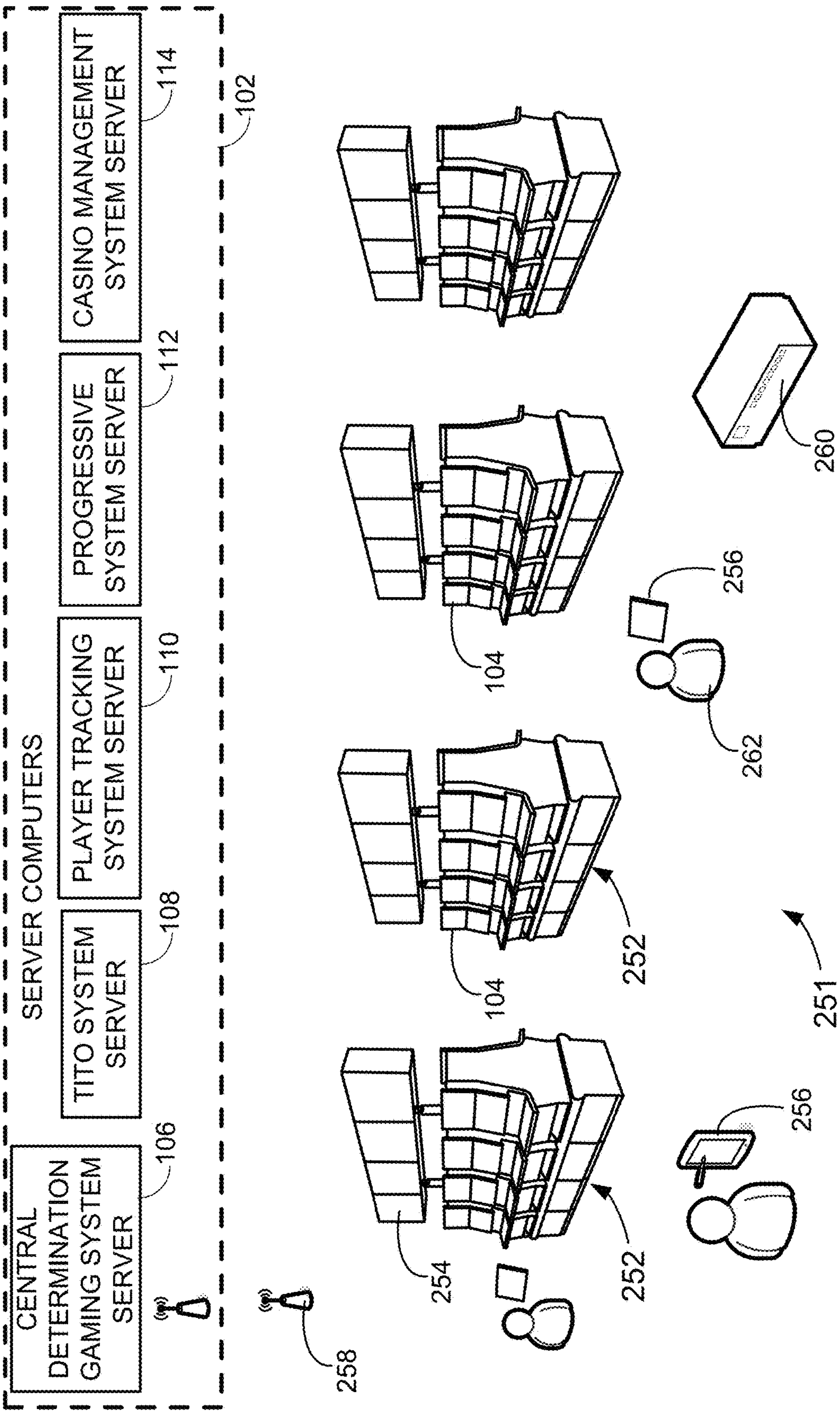
FIG. 2B depicts an example casino gaming environment in accordance with the present disclosure.

FIG. 2B depicts an example casino gaming environment in accordance with the present disclosure. In this example, the casino 251 includes banks 252 of EGMs 104. In this example, each bank 252 of EGMs 104 includes a corresponding gaming signage system 254. According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
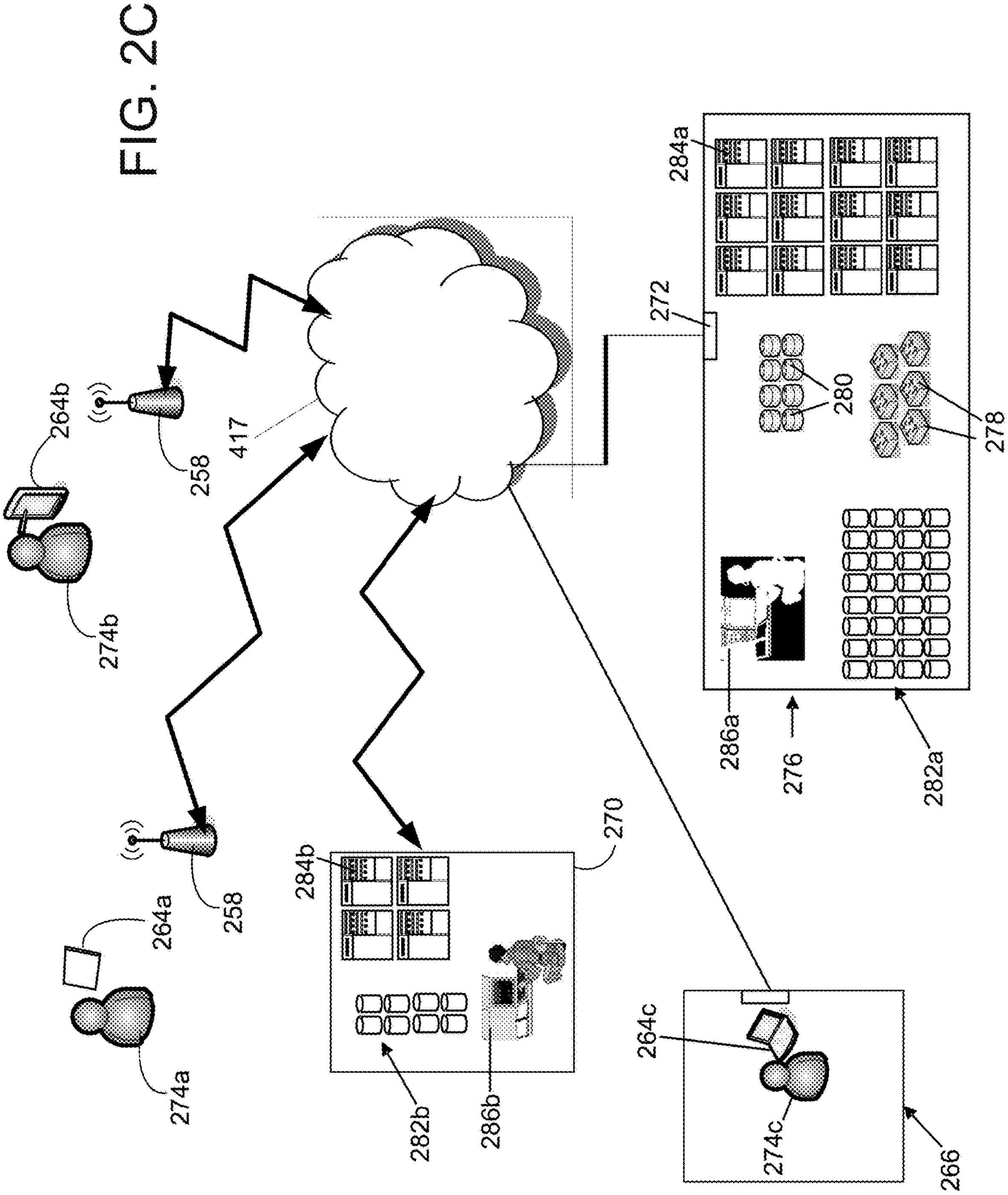
FIG. 2C is a diagram that shows examples of components of a system for providing online gaming in accordance with the present disclosure.

FIG. 2C is a diagram that shows examples of components of a system for providing online gaming in accordance with the present disclosure. As with other figures presented in this disclosure, the numbers, types and arrangements of gaming devices shown in FIG. 2C are merely shown by way of example. In this example, various gaming devices, including, but not limited to, end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations, one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
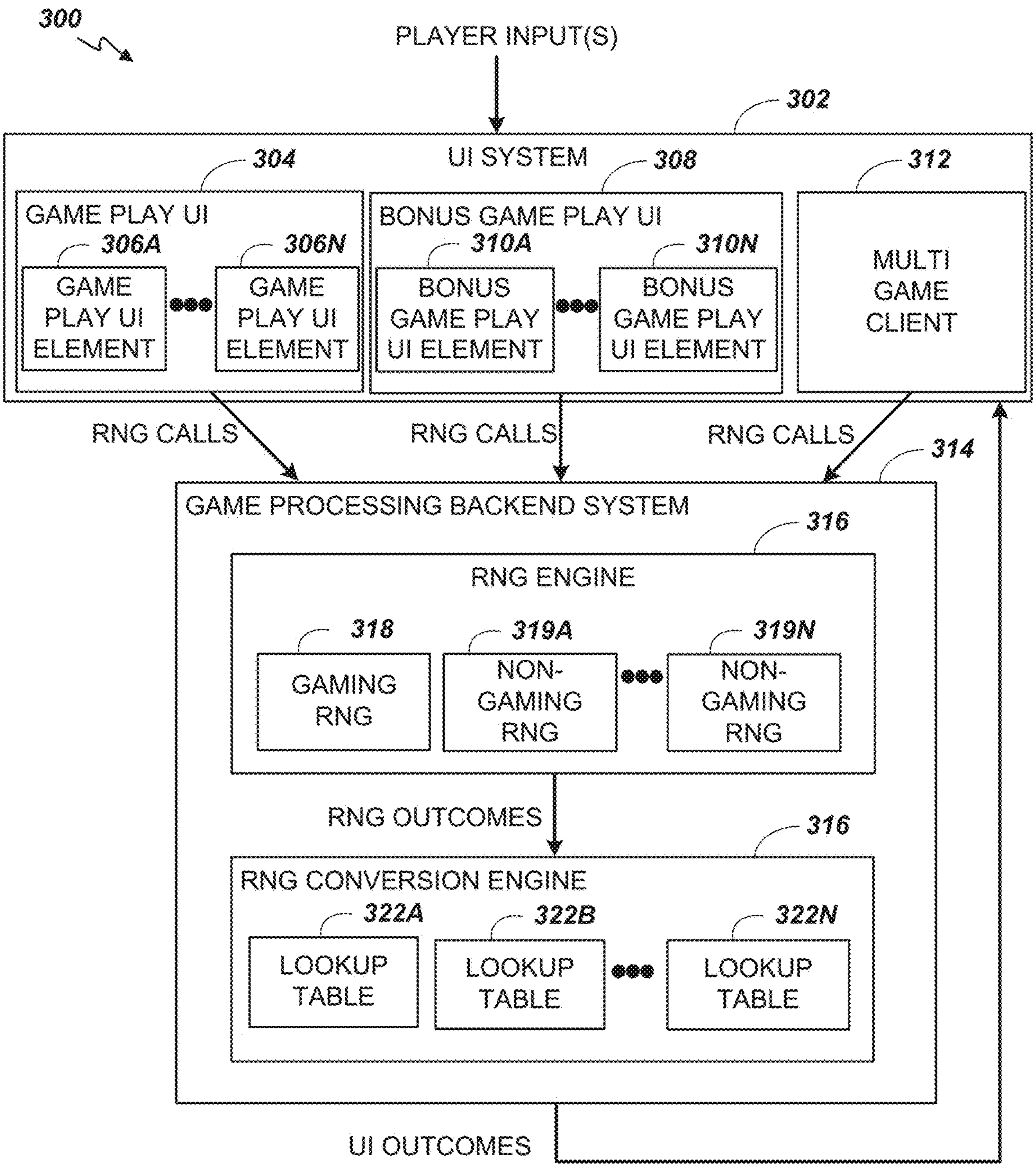
FIG. 3 illustrates, in block diagram form, an embodiment of a game processing architecture algorithm that implements a game processing pipeline for the play of a game in accordance with some embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI elements 306A-306N are similar to the bonus game play UI elements 310A-310N. In other embodiments, the game play UI elements 306A-306N can differ from the bonus game play UI elements 310A-310N.

FIG. 3 also illustrates that UI system 302 could include a multiplayer UI 312 purposed for game play that differ or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computationally less expensive. Non-gaming RNGS 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

In the example embodiment, RNGs, such as gaming RNG 318, may be used to determine the types of zone patterns to display for a round of play of a feature game instance. As described below in detail, when gameplay of the feature game is triggered by the occurrence of a triggering event (e.g., the appearance of a certain number of prize symbols) during a reel-based base game, RNGs may be used to decide a quantity and type of zone patterns to display. In some embodiments, RNGs may also be used to determine the zone multipliers to assign to zone patterns for each round of play of the feature game. In another example, RNGs may be used to determine the combination of zone pattern and zone multiplier to display for each round of free play.

Different lookup tables could be utilized depending on the different game modes. For example, a base game may be associated with one or more base game tables. In addition, feature game events of a feature game may also be associated with a feature game look up table. For example, a feature game look up table may be referenced to determine the feature game overlay to use for a particular round of gameplay of the feature game as described below. In particular, a feature game look up table may be referenced to determine the zone patterns (e.g., polyomino configurations) to utilize for a given round of gameplay. A feature game table may be referenced to identify the multipliers to associate with the various zone patterns for each round of gameplay of the feature game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

Throughout this specification and in the claims, the terms "primary game" and "bonus game" refer to a game session that includes more than one game event or, simply, one or more games. The primary game may correspond to a primary or "base" game, as opposed to a bonus game, as described below. The primary game may be initiated in response to a wager or credit being received by or transferred to gaming machine 104A (shown in FIG. 1). The primary game (as well as one or more games comprising the primary game) may also be initiated by other game events including, for example, a player selecting a "spin" button, a start button, a deal button, or any other such input selector designated for initiating a game session. The primary game may be terminated voluntarily in response to an input by the player indicating that the player wishes to stop the game or automatically by the gaming device in response to a termination event, such as a zero credit balance in the reel game.

Further, as used herein, the terms "bonus game," "feature game," "secondary game," and "bonus game session" refer generally to a game or a component of a game involving procedures in addition to the primary game. The feature game may be initiated during play of the primary game and in response to a particular condition occurring during the primary game (e.g., a trigger condition). The feature game may include a plurality of feature game events. For example, where the primary game includes a slot machine game, the feature game may allow players a possibility of winning more than the pay table for the primary game indicates. Typically, a feature game outcome may depend upon a particular symbol being displayed when one of a plurality of final game events takes place. In some embodiments, the outcome of the feature game may be unrelated to the outcome of the primary game.

In one example embodiment, a hold and spin feature game is provided when a triggering event occurs in the base game. In this example, the triggering event occurs when six prize symbols appear on the base game play area. As the base game transitions into the feature game, the six prize symbols are held in position on the play area, while the non-prize symbols of the remaining symbol display positions are removed. In the feature game, the symbol display positions for the non-prize symbols become individual reels ("feature game reels") that may display prize symbols and non-prize symbols during play of the feature game. In some embodiments, symbol display positions of the base game are already individual reels, and the symbol display positions for the non-prize symbols remain individual reels in the feature game. Additionally, in the feature game, a feature game overlay of geometric zone patterns are overlaid on the displayed reel positions. Upon each spin, if a prize symbol appears on a feature game reel, then the player is awarded the credit prize included on the prize symbol. Further, when a player completes a zone pattern with prize symbols, the awarded credit prizes within the zone pattern may be multiplied by a zone multiplier associated with that zone pattern.

Figure 4:
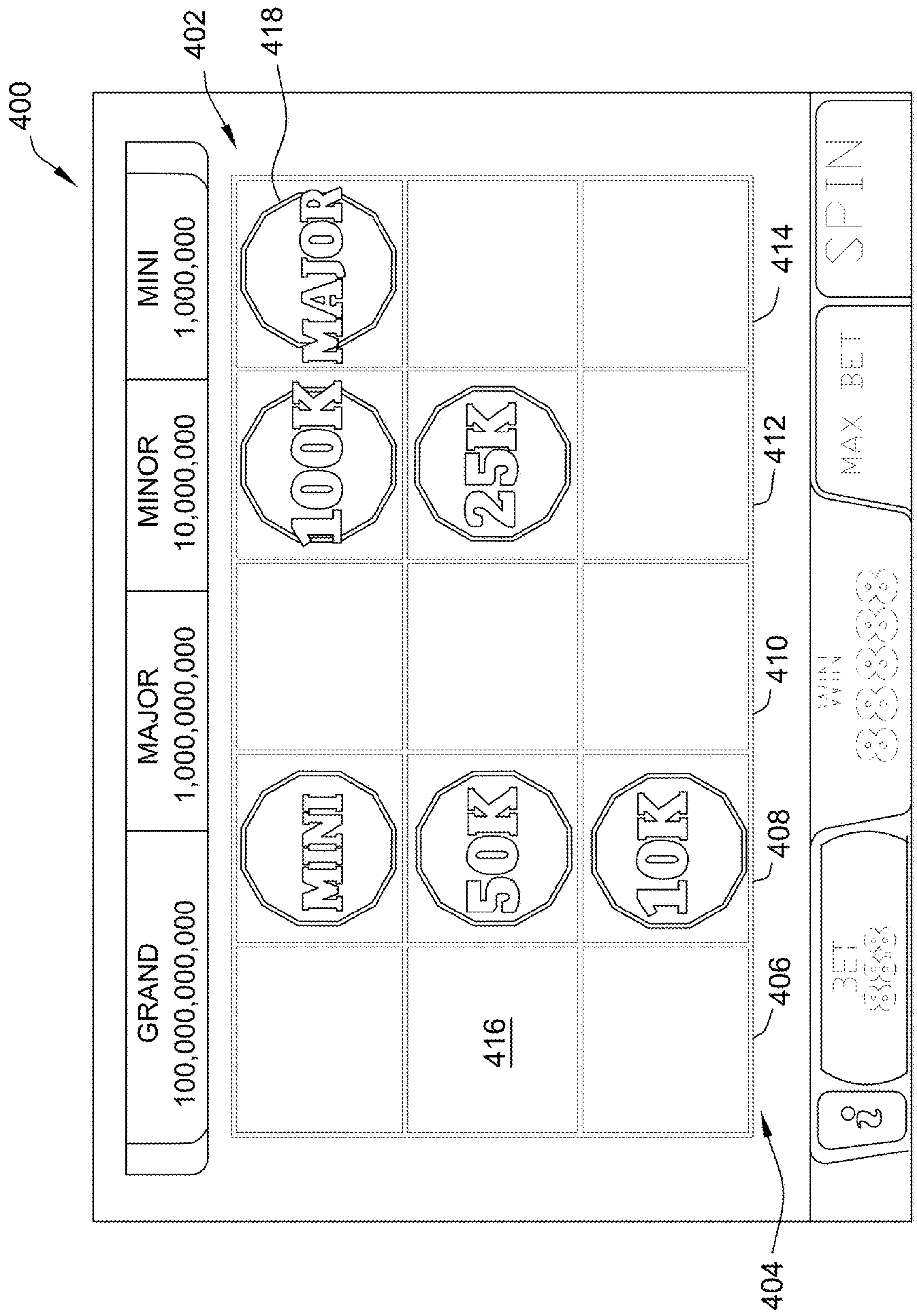
FIG. 4 is a diagram illustrating a screenshot of a base game play area of an example base game when a hold and spin feature is activated in the example base game in accordance with the present disclosure.

FIG. 4 illustrates a screenshot 400 showing an example reel-based base game, in which a hold and spin feature is activated from the base game based upon a triggering event (e.g., a certain number of prize symbols) occurring in the base game in accordance with the present disclosure. In particular, screenshot 400 illustrates a base game play area 402 that includes a plurality of reels 404 that may spin and stop (e.g., with physical reels) or may be simulated to spin and stop (e.g., with virtual reels) in response to a player submitting a wager and initiating the base game. In some embodiments, play area 402 may be presented by one or more EGMs 104A-104X (shown in FIG. 1) or the gaming device 200 (shown in FIG. 2A) when a player initiates play of the base game. In further embodiments play area 402 may be presented on at least one mobile gaming device 256, such that the base game and feature game are played on at least one mobile gaming device 256 in communication with gaming data center 276 via networks 417.

In the example embodiment, reels 404 include a first reel 406, a second reel 408, a third reel 410, a fourth reel 412, and a fifth reel 414. However, any suitable number of reels, such as one reel to reels numbering greater than five reels, may be implemented on a variety of embodiments. Each reel 404 includes a plurality of symbol display positions 416 which, together, define a matrix of symbol display positions (e.g., represented as base game play area 402). Further, each reel is configured to display a certain number of symbols. Each symbol display position of reels 404 may also include a symbol. As shown in FIG. 4, base game play area 402 includes five reels with each reel displaying three symbol display positions 416. Thus, a total of fifteen symbol display positions 416 define base game play area 402 in screenshot 400. In some embodiments each base game symbol display position 416 may be an individual reel (i.e., each of the fifteen display symbol positions 416 may be an individual reel), for a total of fifteen reels each with a single display position 416.

Reels 404 may include simulated or "virtual" reels generated and displayed by one or more processors 204 (such as processors of game controller 202) on any game display, such as primary game display 240, secondary game display 242, topper display 216, player tracking interface display 228, and/or any other suitable display device. In other embodiments, reels 404 may include one or more physical (e.g., mechanical) reels having a display element, such as a liquid crystal display (LCD), capable of displaying one or more symbols during gameplay. In other embodiments, reels 404 may include a plurality of mechanical reels overlaid by an LCD panel.

During play of the base game, reels 404 may be spun, such that various symbols are displayed on reels 404. In the example embodiment, symbols displayed on reels 404 include "prize" symbols and "non-prize" symbols. Each reel is configured to display prize symbols and non-prize symbols. As used herein, a "prize" symbol may refer to any symbol having a prize shown in the symbol (e.g., a displayed credit award amount or a progressive jackpot value). A player is awarded any credit value shown on the prize symbol. As used herein, a "non-prize" symbol may refer to any symbol that is not a prize symbol, including blank symbols and picture symbols. In some embodiments, game controller 202 may display "wild symbols" during the base game. As used herein, a "wild" symbol may refer to any symbol capable of substituting (e.g., on a line win or ways win) for a prize symbol.

In the example embodiment, a prize symbol 418 is configured to unlock a hold and spin feature when a certain number of prize symbols appear on play area 402 during a single gameplay (e.g., during a single spin) of the base game. As shown in FIG. 4, in the example embodiment, when six or more prize symbols 418 appear on play area 402, the triggering event occurs and the "hold and spin" feature is unlocked. However, in various embodiments, the triggering event may be based upon any suitable number of prize symbols. Prize symbols may be displayed by any of reels 406-414. Prize symbols may all have the same shape, color, and/or size.

In the example embodiment, upon occurrence of the triggering event, the six or more prize symbols 418 are held in position (e.g., locked in place) on play area 402 while the symbols displayed in the other symbol display positions are removed. As shown in FIG. 4, the six prize symbols displayed by second reel 408, fourth reel 412, and fifth reel 414 are locked in place for the hold and spin feature while the non-prize symbols in the remaining nine symbol display positions of play area 402 are removed. Prize symbols 418 locked in position are subsequently used by a player in the hold and spin feature game. As explained below in detail, in the hold and spin feature game, each symbol display position of play area 402 is configured to become an independent reel ("feature game reels").

Figure 5:
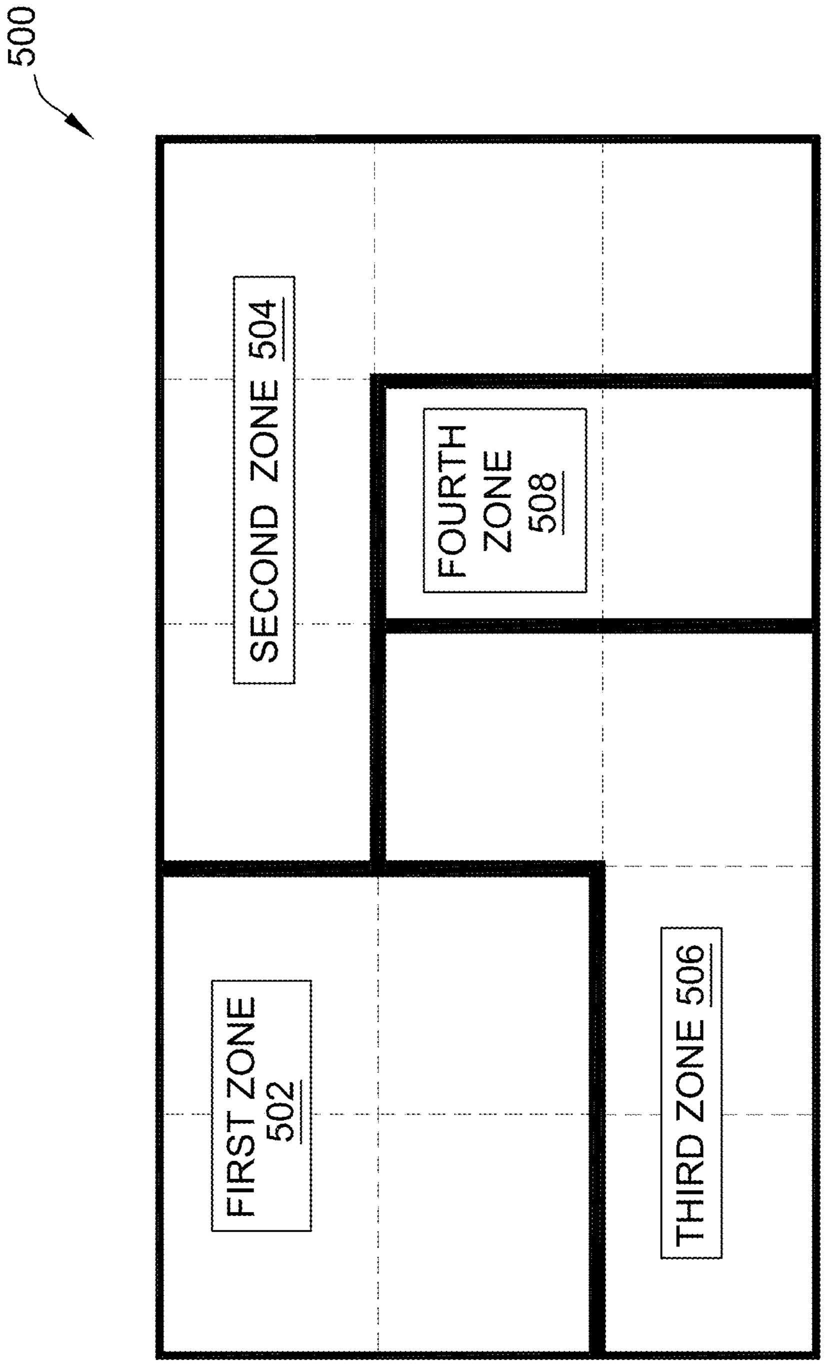
FIG. 5 is a diagram illustrating an example feature game overlay associated with an example hold and spin feature game in accordance with the present disclosure.

FIG. 5 is a diagram illustrating an example feature game overlay 500 associated with a hold and spin feature game activated from the base game based upon a triggering event (e.g., a certain number of prize symbols) occurring in the base game in accordance with the present disclosure. FIG. 5 illustrates overlay 500 with respect to an empty base game play area 402. In FIG. 5, geometric shapes arranged in a plurality of zone patterns (e.g., zones) are positioned within play area 402. Overlay 500 includes a first zone pattern 502, a second zone pattern 504, a third zone pattern 506, and a fourth zone pattern 508. Zone patterns 502-508 do not overlap with one another. Rather, each zone pattern is arranged to fit with other zone patterns, such that the zone patterns together cover all symbol display positions 416 of play area 402. In FIG. 5, four zone patterns are displayed in overlay 500. However, game controller 202 is configured to divide play area 402 into any number of zone pattern combinations. Thus, any suitable number of zone patterns having any geometric shape may be implemented on a variety of embodiments.

Zone patterns 502-508 may be characterized as polyomino configurations arranged to cover the entirety of play area 402. Each zone pattern (e.g., polyomino configuration) includes a number of connecting symbol display positions of play area 402. As shown in FIG. 5, first zone pattern 502 includes four connecting symbol display positions that span across first reel 406 and second reel 408 (shown in FIG. 4). Second zone pattern 504 includes five connecting symbol display positions that span across third reel 410, fourth reel 412, and fifth reel 414. Third zone pattern 506 includes four symbol display positions that span across first reel 406, second reel 408, and third reel 410. Fourth zone pattern 508 includes two symbol display positions of fourth reel 412. Although example overlay 500 illustrates zone patterns 502-508 in a specific arrangement, game controller 202 may use different overlays having same zone patterns 502-508 in different arrangements. For example, zone patterns 502-508 may be rotated and moved to cover different symbol display positions of play area 402. Zone patterns 502-508 may be positioned in any suitable arrangement on play area 402 that enables the entirety of play area 402 to be covered.

In the example embodiment, overlay 500 may include different polyomino configurations. For example, overlay 500 may include a polyomino configuration that includes five connecting symbol display positions that span linearly across reels 404-414. In another example, overlay 500 may include a polyomino configuration that includes four connecting symbols that span linearly across reels 404-414. In the example embodiment, overlay 500 includes any suitable polyomino configuration based upon the number of connecting symbol display positions available on play area 402.

Figure 6:
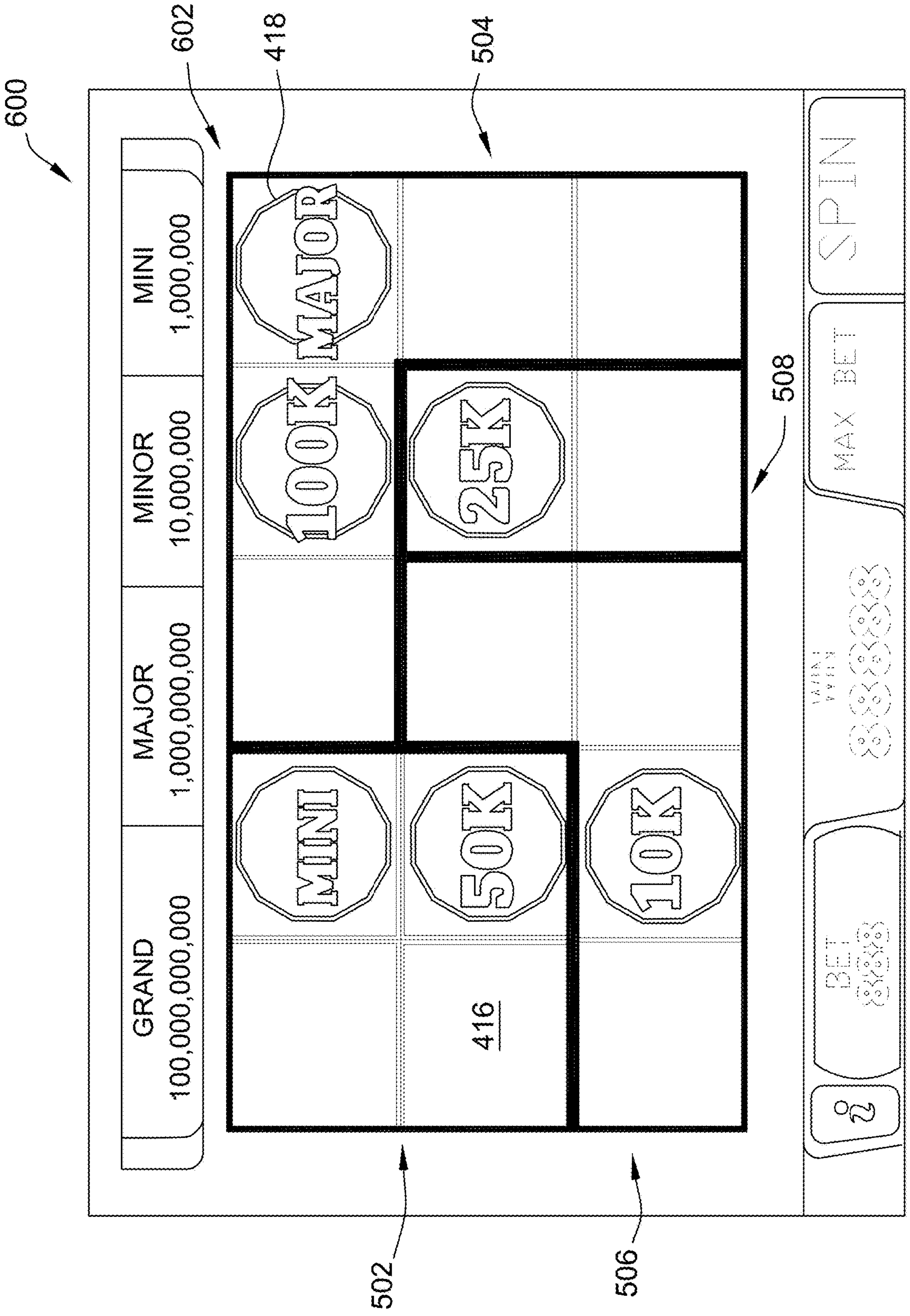
FIG. 6 illustrates a first screenshot of a feature game play area for the example feature game, in which the feature game overlay of FIG. 5 is overlaid onto the reels of the base game play area shown in FIG. 4.

FIG. 6 illustrates a first screenshot 600 of a feature game play area 602 for a hold and spin feature game. In particular, in the feature game, each symbol display position 416 is configured to be an individual feature game reel. Thus, feature game play area 602 includes fifteen independent feature game reels, with each feature game reel displaying a single symbol display position. In other words, feature game play area 602 may be characterized as overlay 500 (shown in FIG. 5) positioned on top of symbol display positions 416 of base game play area 402 (shown in FIG. 4). Each symbol display position of play area 402 becomes an independent reel in the feature game.

Figure 7A:
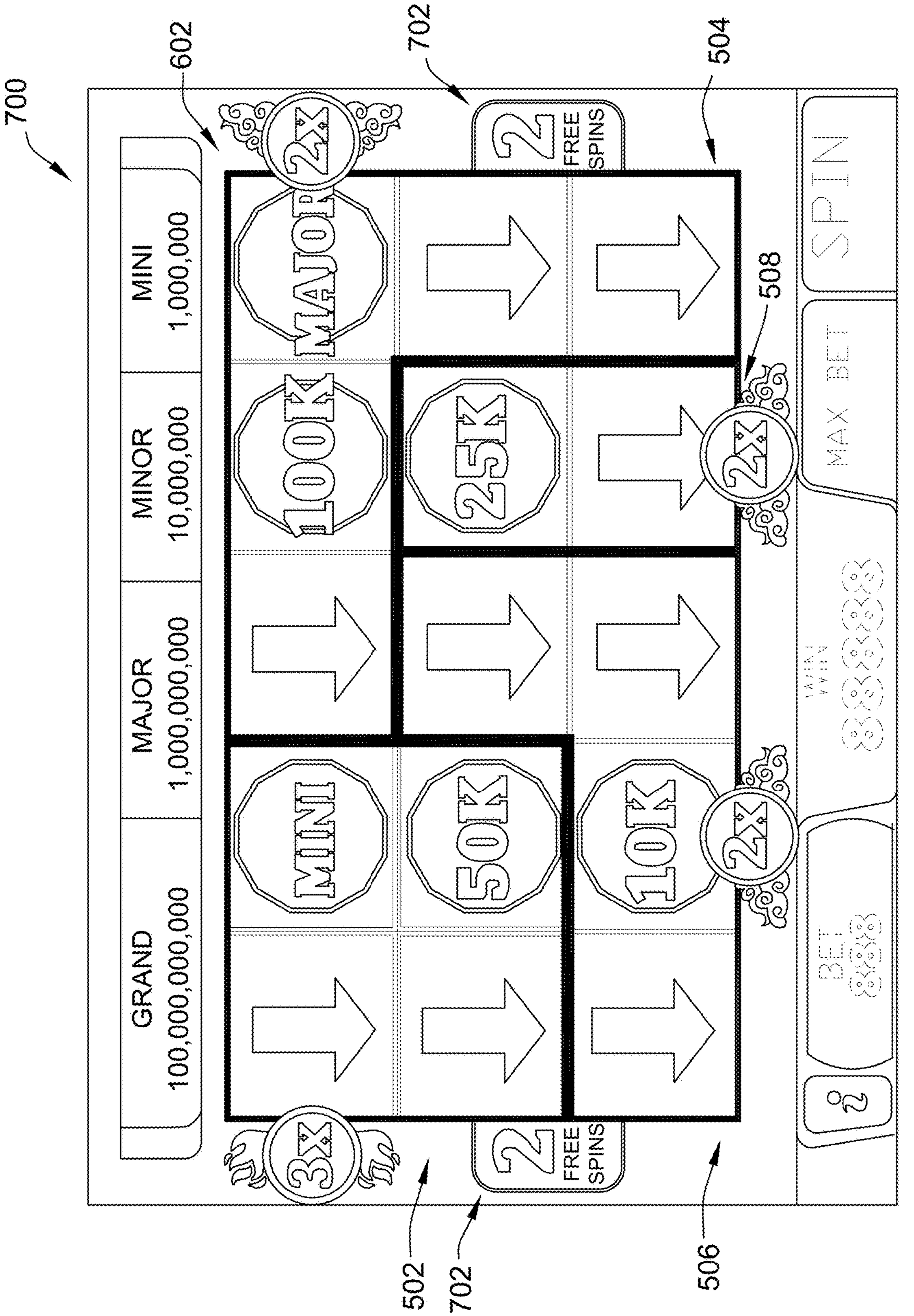
FIG. 7A illustrates a second screenshot of the example feature game when a triggering event shown in FIG. 4 occurs during gameplay of the base game.

FIG. 6 further depicts feature game play area 602 before the player initiates a first round of play. Upon activation of the hold and spin feature game, game controller 202 is configured to position overlay 500 onto symbol display positions 416 of base game play area 402 to display feature game play area 602. Each symbol display position of base game play area 402 becomes an independent feature game reel. As explained above, in the example embodiment, the feature game is activated based upon a certain number of prize symbols 418 displayed on play area 402 after a spin. In this example, six prize symbols 418 appear to unlock the feature game. As shown in screenshot 400, during play of the base game in this example, prize symbols 418 are displayed on second reel 408, fourth reel 412, and fifth reel 414 of base game play area 402, thereby triggering the feature game. The six prize symbols 418 are held in place and used for gameplay of the feature game. As shown in FIG. 7A below, during the feature game, the individual feature game reels displaying the six prize symbols 418 are locked in position and do not spin when the other feature game reels spin. In feature game play area 602, first zone pattern 502 and second zone pattern 504 each include two prize symbols 418. Third zone pattern 506 and fourth zone pattern 508 each include one prize symbol 418.

Figure 7B:
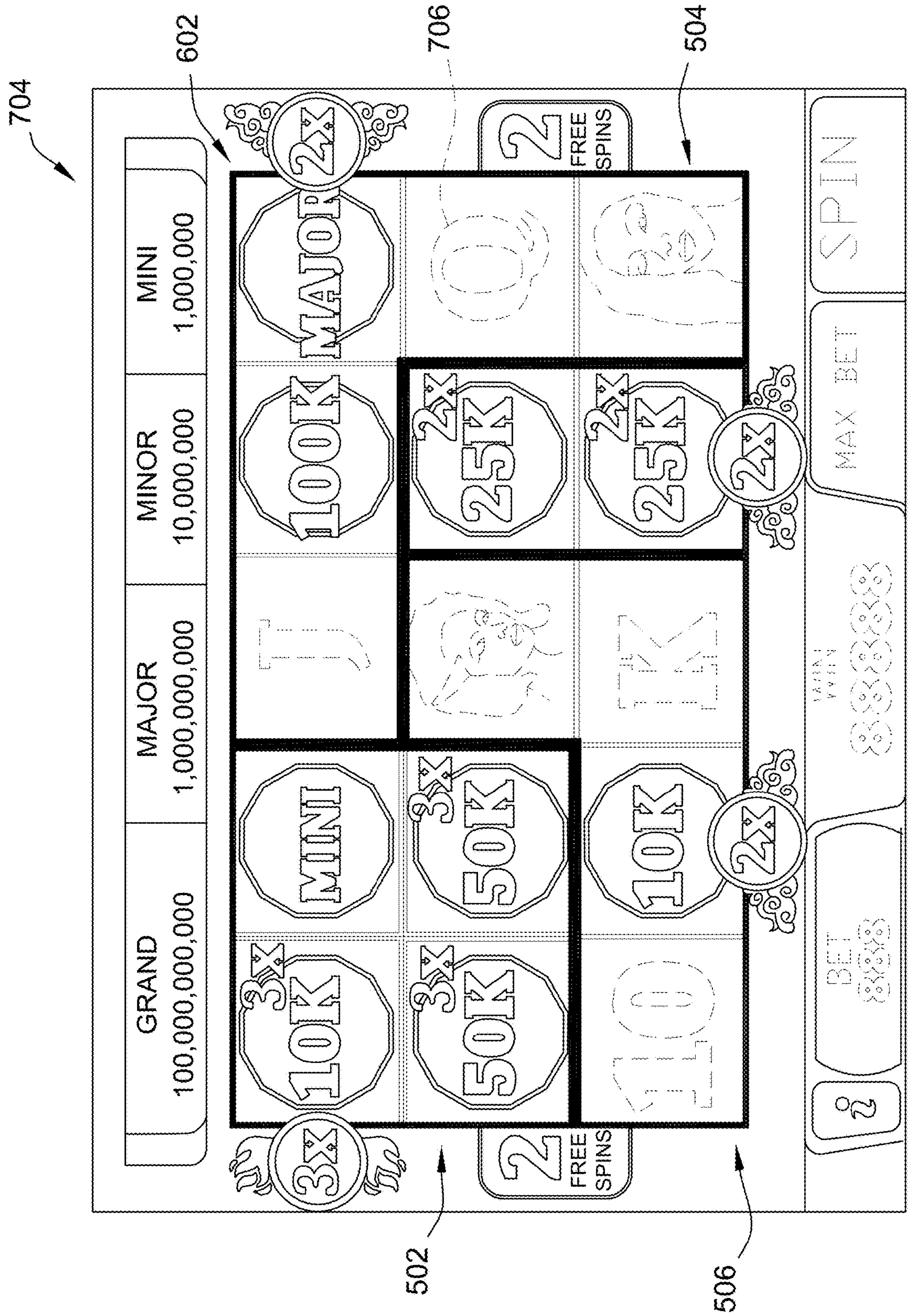
FIG. 7B illustrates a third screenshot of an example spin result on the feature game play area shown at FIG. 6 after a first round of gameplay of the example feature game.
Figure 9:
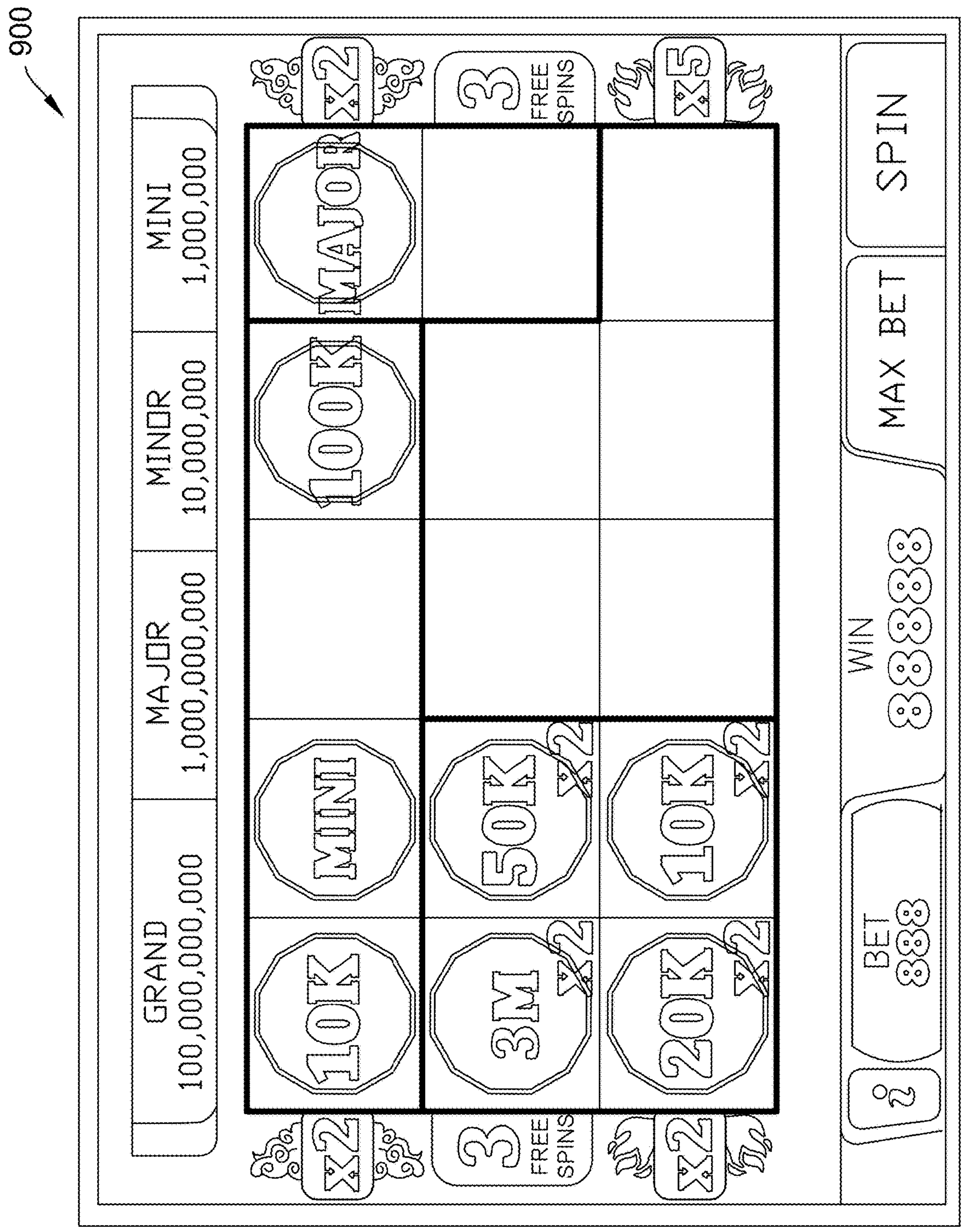
FIGS. 9-15 are various screenshots illustrating different example feature game play areas for the example feature game.
Figure 10:
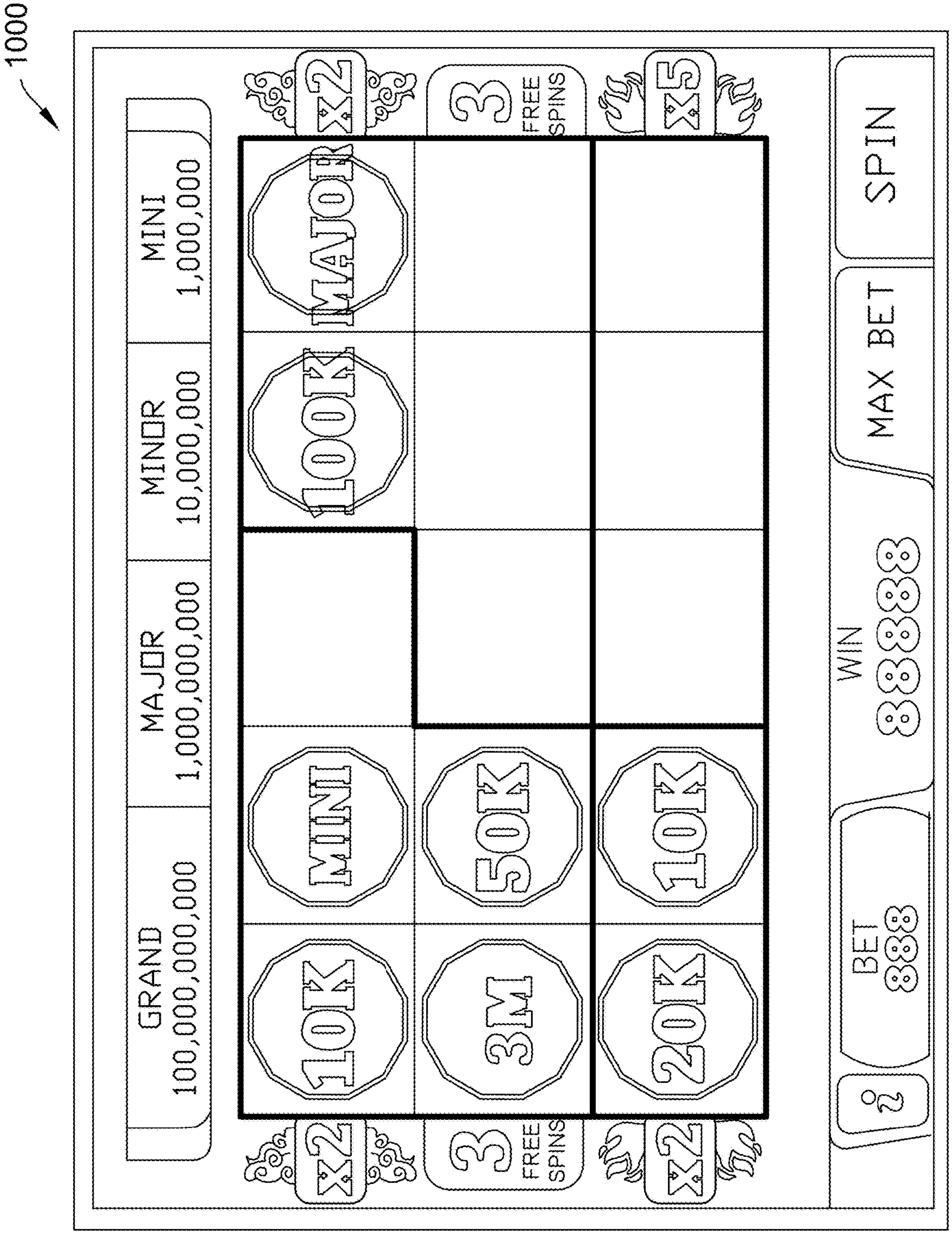
Figure 11:
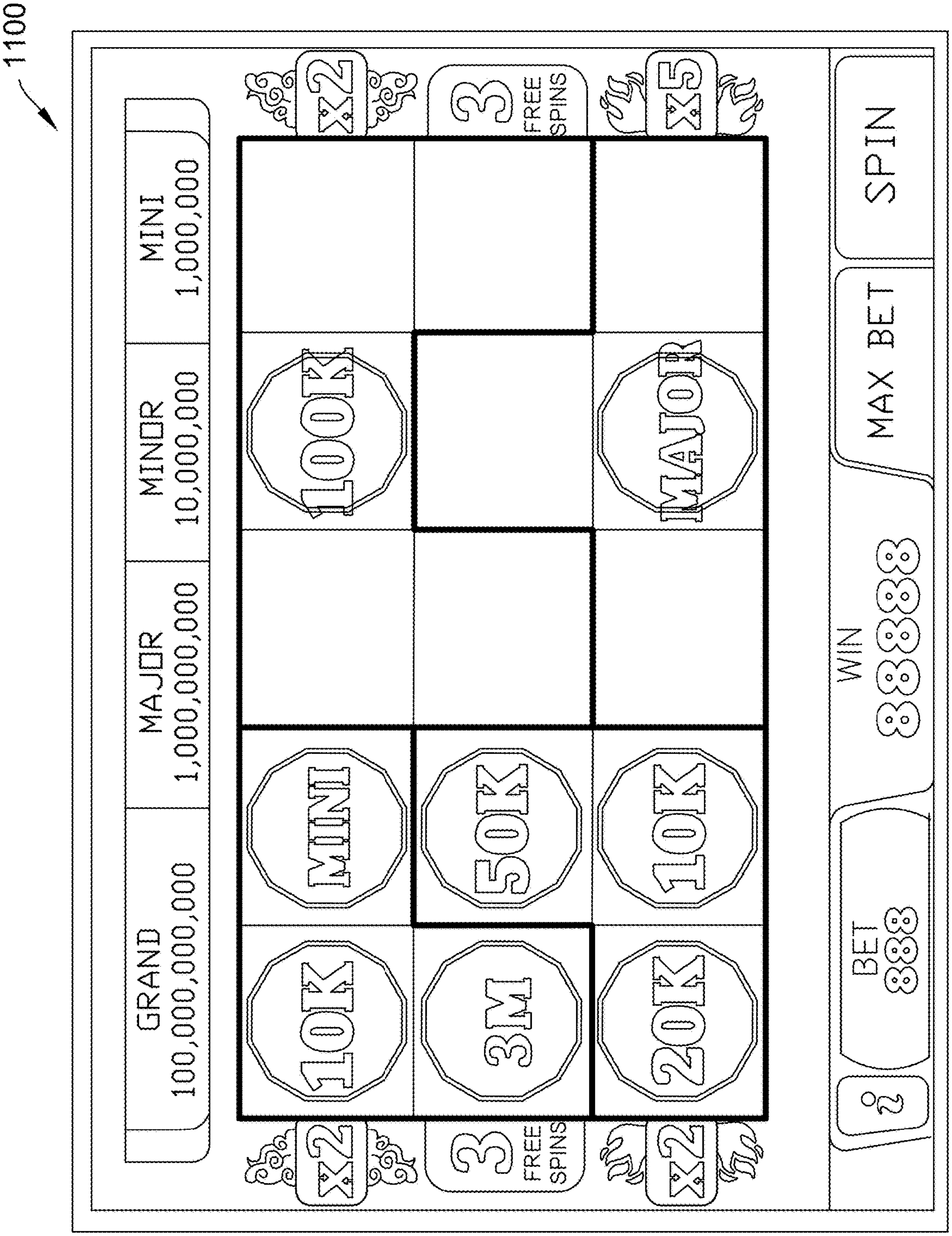
Figure 12:
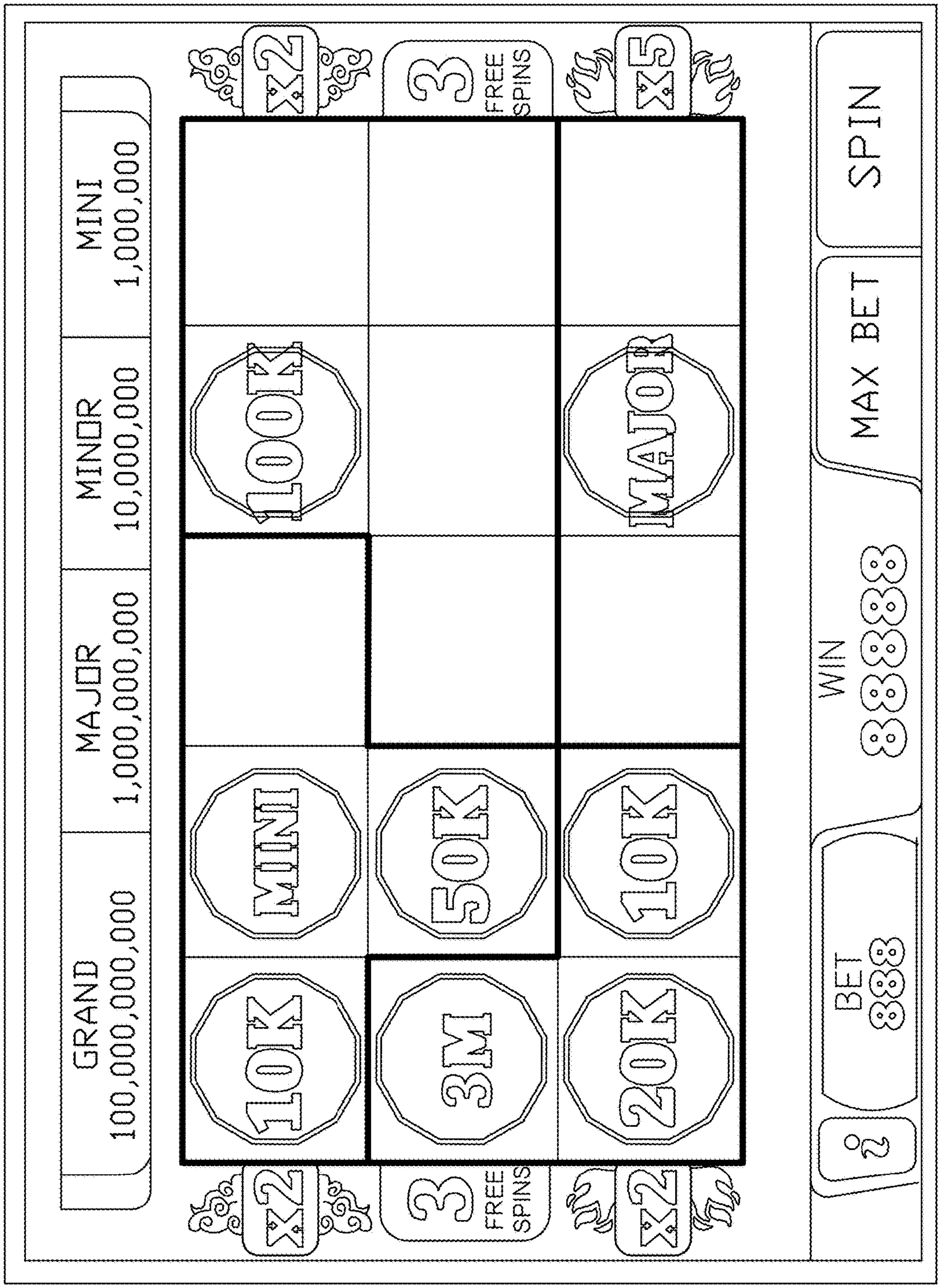
Figure 13:
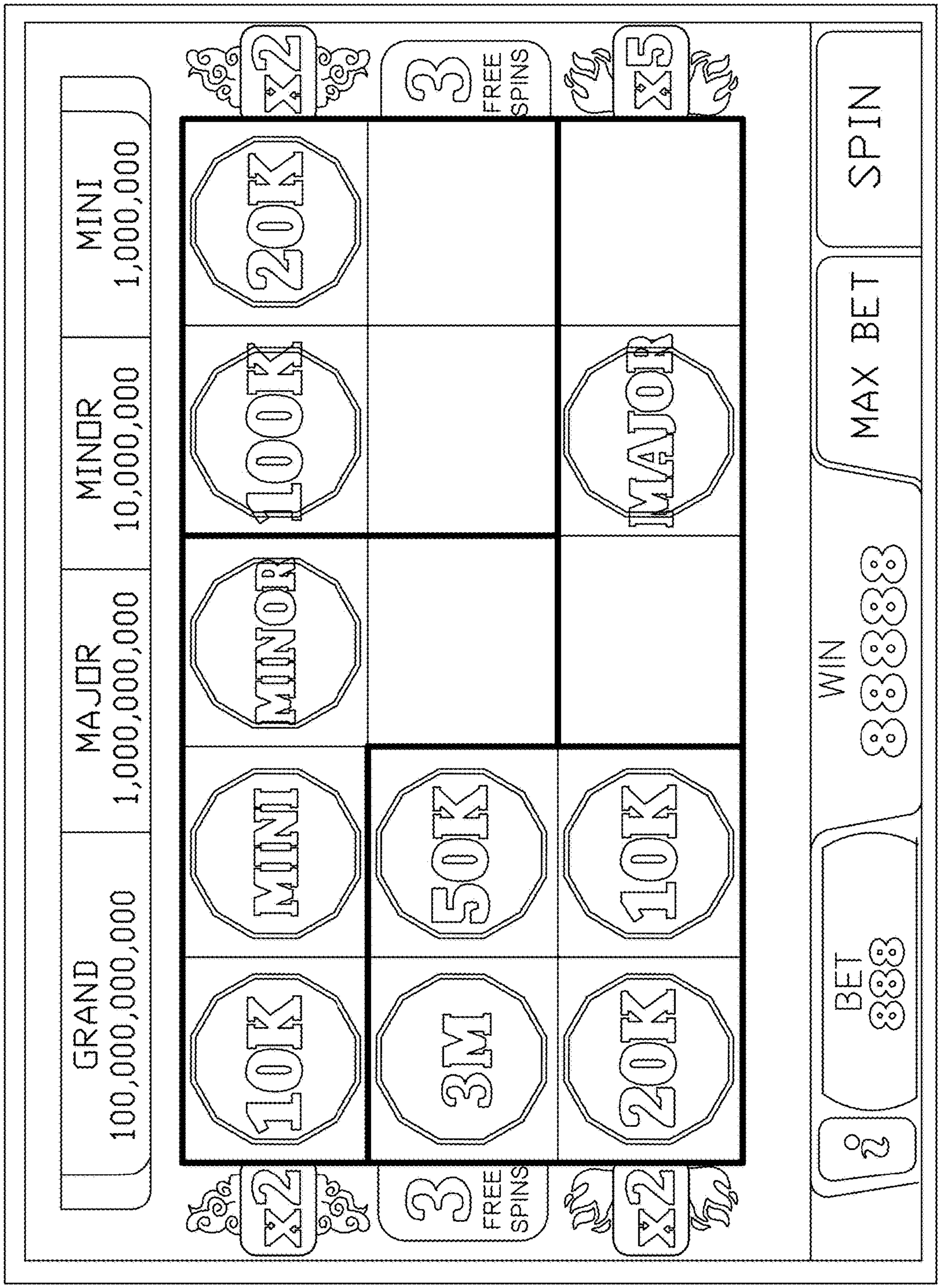
Figure 14:
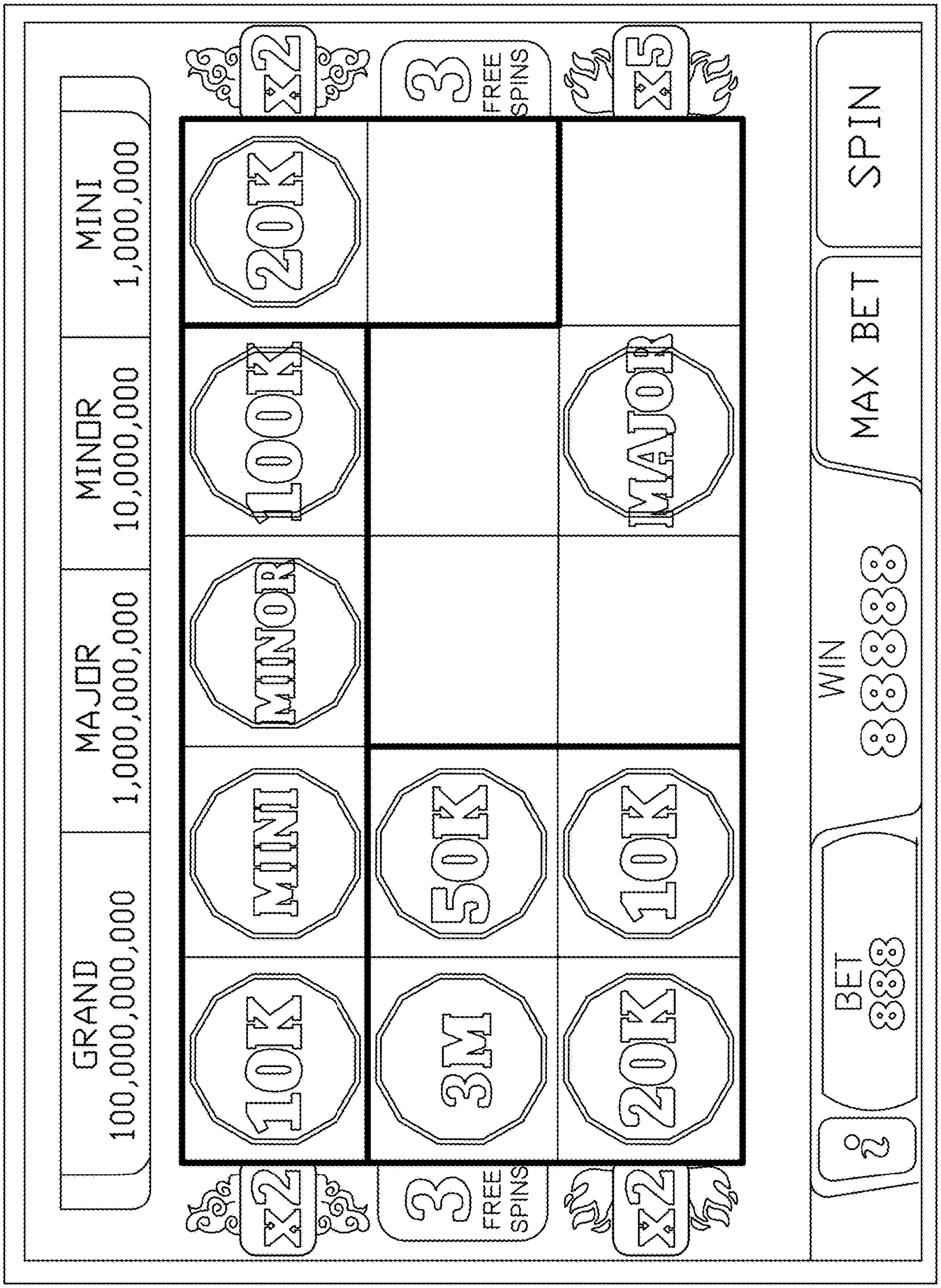
Figure 15:
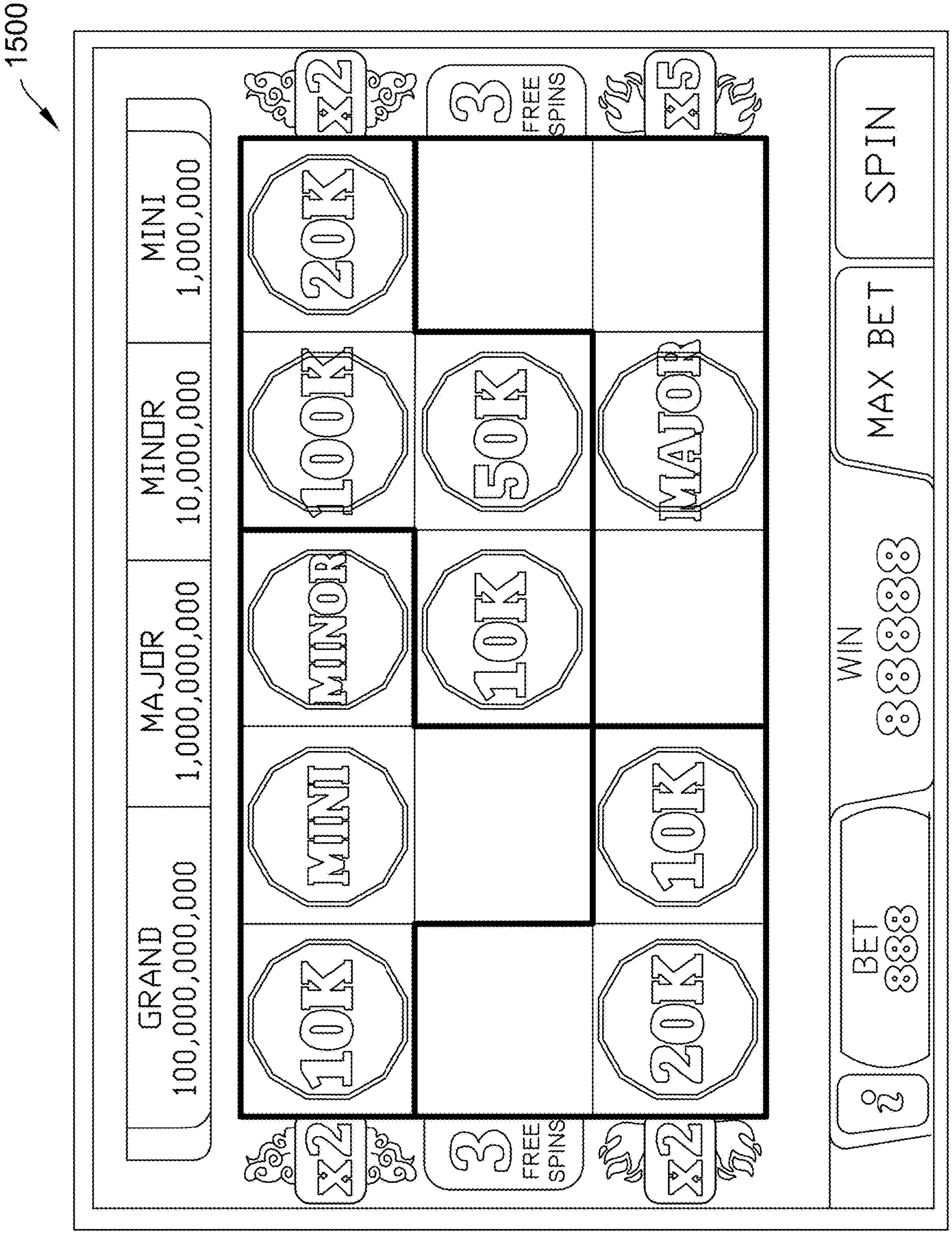

FIG. 7A and FIG. 7B illustrate game play progression for an example game instance of the feature game. As explained above, the feature game is a bonus game separate and distinct from the base game. The player may be allocated any number of initial spins (e.g., "free spins") during the feature game as depicted by a free spin counter 702 associated with the feature game, as shown by FIG. 7A. FIG. 7A illustrates a second screenshot 700 of a hold and spin feature game triggered when a triggering event shown in FIG. 4 occurs during gameplay of the base game. As explained above, feature game play area 602 includes overlay 500 (shown in FIG. 5) positioned over reels 404 of base game play area 402 (shown in FIG. 4).

FIG. 7A depicts each zone pattern 502-508 of feature game play area 602 accompanied by a zone multiplier. In screenshot 700, a "3×" zone multiplier is associated with first zone pattern 502 and a "2×" zone multiplier is associated with each of second zone pattern 504, third zone pattern 506, and fourth zone pattern 508. Zone patterns 502-508 may be of any polyomino shape such that zone patterns 502-508 fill all of game play area 602. In some embodiments, the polyomino shapes used to fill game play area 602 may be determined by game backend system 314 such that RNG engine 316 produces an RNG outcome and RNG conversion engine 320 utilizes lookup tables 322A-322N to determine the polyomino shapes to fill game play area 602. Examples of different combinations of polyomino shapes used to fill game play area 602 are shown in FIGS. 7B and 9-15. For example, each of the polyomino configurations in FIGS. 7B and 9-15 may correspond to a position in a lookup table (e.g., lookup tables 322A-322N). Thus, when an RNG outcome from RNG engine 316 corresponds to a position in the lookup table for the polyomino configurations, the polyomino shapes corresponding with the respective position in the lookup table determined by the RNG outcome are used to fill gameplay area 602.

In the feature game, game controller 202 assigns zone multipliers to each zone pattern 502-508. Zone multipliers may include 2×, 3×, 4×, and 5× multipliers, for example. Zone multipliers may be determined by game backend system 314 such that RNG engine 316 produces an RNG outcome and RNG conversion engine 320 utilizes lookup tables 322A-322N to determine the multipliers to be applied to each zone pattern. FIGS. 8A-8D represent example lookup tables that may be used by RNG conversion engine 320 in determining the multipliers to be applied to each zone pattern in accordance with the present disclosure. In this example, RNG outcomes from RNG engine 316 may include a value of 1-7. The RNG outcome then matches a number in the first column of FIGS. 8A-8D, depending on which lookup table is being used. The corresponding values in the same row as the number determined by the RNG outcome will then be applied to the corresponding zone pattern. For example, if the lookup table in FIG. 8C is being used by RNG conversion engine 320, and the RNG outcome is 5, the multiplier values for the zone patterns will be 3, 2, 4, and 4 respectively because those are the values that appear in the row corresponding with an RNG outcome of 5 in the lookup table in FIG. 8C.

The multiplier value applied to each zone pattern may be determined at least in part by a wager amount place by a player. For example, a player who has placed a higher wager amount may have a chance of having higher multiplier values applied to at least some zone patterns than a player who has placed a lower wager amount. As another example, a lower wager placed by a player may cause RNG conversion engine 320 to use the lookup table shown in FIG. 8A, while a higher wager placed by a player may cause RNG conversion engine 320 to use the lookup table shown in FIG. 8B, and even higher wagers placed by a player may cause RNG conversion engine 320 to use the lookup table shown in FIG. 8C or FIG. 8D.

In the example embodiment, zone multipliers are only applied to credit values within a corresponding zone pattern when the zone pattern is completely filled with prize symbols 418. In the event a zone pattern is completed with prize symbols 418, the corresponding zone multiplier may not be applied to jackpot values (e.g., major, minor, mini) within the zone pattern. In other embodiments, when a zone pattern is completely filled the zone multiplier is applied to all prize symbols within the zone pattern. When less than all of the symbol display positions of a given zone pattern are populated with prize symbols 418, the zone multiplier associated with the given zone pattern is not applied to any prize symbol 418 within the given zone pattern, but the prizes associated with the prize symbols 418 are still awarded.

In some embodiments, when all of the symbol display positions are populated with prize symbols 418, a grand jackpot may be awarded. The grand jackpot may be a jackpot including a larger prize than the other jackpots available in the bonus game. The intermediate jackpot values that may be associated with prize symbols 418 (e.g., major, minor, mini) provide a player with potential intermediate prizes that may excite them while playing the example bonus game. The zone pattern multiplier element provides further goals for a player playing the bonus game, rather than the only goal being to receive the grand jackpot. For instance, even if a player has a long way to go until the each display position is populated with prize symbols and the grand jackpot is awarded, they may be only one display position being populated with a prize symbol away from completing a zone pattern and thus receiving the zone multiplier associated with the given zone pattern. Accordingly, the bonus game described herein increases player excitement as there are a plurality of intermediate prizes and/or multipliers as opposed to the only potential awards being the awards associated with the prize symbols and/or a grand jackpot.

In the example embodiment, a zone multiplier of a particular zone pattern is applied to credit values of prize symbols 418 when a particular zone pattern is completely filled in with prize symbols 418. In some embodiments, game controller 202 may be configured to assign zone multipliers to one or more zone patterns based upon the total amount of money wagered for the base game. For example, as the player's wagers for the base game exceed a given threshold, the electronic gaming machine may make certain multipliers with higher increments (e.g., 3×, 4×, and 5×) available as zone multipliers for the feature game. Additionally, zone patterns may be colored, as shown by FIGS. 9-17. In some embodiments, zone multipliers may be associated with a specific color. In these embodiments, when a zone multiplier is assigned to a particular zone pattern, the zone pattern may be colored with the color associated with the zone multiplier. In other embodiments, each zone pattern may be associated with a specific color. In further embodiments, when a zone pattern is completely filled with prize symbols 418, the zone pattern may convert from being displayed as darkened to illuminated.

FIG. 7A depicts feature game play area 602 for the feature game after the player initiates a first round of play. In the example embodiment, upon transitioning from the base game to the feature game, symbol display positions 416 of base game play area 402 become individual feature game reels in feature game play area 602 that spin and stop independently and/or one at a time (or in groups at a time). More specifically, feature game reels displaying prize symbols 418 are locked in position and do not spin during the feature game. The remaining feature game reels are configured to spin and stop during the feature game to display either prize symbols 418 or non-prize symbols 706. In FIG. 7A, a player initiates play of the feature game. The feature game reels corresponding to the six prize symbols 418 from the base game are held in position while the remaining nine feature game reels individually spin in motion (illustrated here as downward arrows).

In this example, the player is allocated three free spins in the feature game. The player may initiate each spin using a spin button, such as player input button 236 (shown in FIG. 2A). With each spin, the player may fill feature game play area 602 with one or more prize symbols 418. In the example embodiment, when one or more prize symbols 418 appear on feature game play area 602, the player is awarded an additional free spin. For example, if one or more prize symbols 418 appear upon initiating a third and final free spin, the player is awarded a subsequent free spin. However, in the same example, if prize symbols 418 do not appear on feature game play area 602, the player runs out of free spins, and play of the feature game ends. Thus, over successive spins, the player may lock in and accumulate prize symbols 418 in feature game play area 402 for a chance to fill up one or more zone patterns. When a zone pattern is complete with prize symbols 418, the corresponding zone multiplier is applied to the credit values within the zone pattern, and the player is awarded the multiplied credit values. In the example embodiment, the player is awarded the credit values and/or multiplied credit values at the end of the feature game when the player finishes out the free spins. In the event feature game play area 602 is completely filled with prize symbols 418 at the end of the feature game, the player wins the grand jackpot. In further embodiments, a prize symbol 418 and/or plurality of prize symbols may correspond to the player winning the grand jackpot. In an alternative embodiment, when a zone pattern is complete with prize symbols 418, the player is awarded the credit values multiplied by the corresponding multiplier, and the prize symbols 418 of the completed zone pattern are subsequently cleared. In these embodiments, the player may be presented with another opportunity to fill the zone pattern with prize symbols 418. In embodiments where a zone pattern spans an entire row or column of connecting symbol display positions, the player may be awarded a token for completing the zone pattern with prize symbols 418. The player may be awarded a token for clearing rows and/or columns of feature game reels. In these embodiments, the player may win a jackpot if the player accumulates a certain number of tokens during play of the feature game.

In the example embodiment, the player may play more than three rounds of the feature game by winning additional free plays with each spin the player locks in one or more prize symbols. For example, if upon initiating a first round of play, the player locks in one or more additional prize symbols, free spin counter 702 may reset to three free spins. In another example, if upon initiating a last round of free play, the player locks in one or more prize symbols, free spin counter 702 resets to three free spins. Thus, for each free spin the player locks in one or more prize symbols, free spin counter 702 resets to a value of three, thereby providing the player with a higher chance of completing a zone pattern with prize symbols 418.

FIG. 7B illustrates a third screenshot 704 of an example spin result on feature game play area 602 after a first free spin. After a spin, each feature game reel exposes prize symbol 418 having a credit value or a jackpot value (e.g., mini, minor, major, grand) or a non-prize symbol 418. Non-prize symbols 706 may be a blank symbol (not shown) and/or a picture symbol, as shown in FIG. 7B. A blank refers to an empty symbol display position on feature play reels (e.g., no symbol shown).

In the example embodiment, the appearance of a prize symbol 418 indicates a win for that individual feature game reel. Thus, once all of the free spins have been played and the feature game reels stop spinning, play of the feature game is now completed and the player wins the credit value for each prize symbol displayed on feature game play area 602. Additionally, if any of the zone patterns are completely filled with prize symbols 418, the zone multiplier associated with a completed zone pattern is applied to each of the credit values within that zone pattern. In FIG. 7B, first zone pattern 502 is completely filled in with prize symbols 418. Three of the four prize symbols 418 in first zone pattern 502 have credit values.

The tentative "3×" multiplier associated with first zone pattern 502 is applied to each of the three prize symbols 418 having credit values. Further, the zone multiplier becomes an applied multiplier once the multiplier is applied to applicable prize symbols 418. As shown in FIG. 7B, a multiplier indicator appears next to each prize symbol 418 for which a multiplier has been applied. For example, each of the "10K," "50K," and "50K" prize symbols of first zone pattern 502 displays a "3×" multiplier indicator to provide a visual indication to the player that the tentative "3×" multiplier has been applied. In another example, each of the "25K" and "25K" prize symbols of fourth zone pattern 508 displays a "2×" multiplier indicator to indicate to the player that the associated tentative "2×" multiplier has been applied to the respective credit values.

In contrast, unlike first zone pattern 502 and fourth zone pattern 508, each of second zone pattern 504 and third zone pattern 506 are not completely populated with prize symbols 418. Thus, as shown in FIG. 7B, the tentative "2×" multiplier associated with second zone pattern 504 is not applied to the "100K" credit value of the "100K" prize symbol. Similarly, the tentative "2×" multiplier associated with third zone pattern 506 is not applied to the "10K" credit value associated with the "10K" prize symbol. Accordingly, for the first round of gameplay of the feature game, the player is awarded a "100K" credit value for second zone pattern 504 and a "10K" credit value for fourth zone pattern 508. Further, for first zone pattern 502, the player is awarded each of the "10K," "50K," and "50K" credit values multiplied by a factor of three, and for fourth zone pattern 508, the player is awarded each of the "25K" and "25K" credit values multiplied by a factor of two. In FIG. 7B, because the player locked in additional prize symbols 418 during a round of gameplay of the feature game, the player may be awarded an additional free play ("free spin"). Further, because first zone pattern 502 is completely populated, first zone pattern 502 will go from being darkened to being illuminated to further indicate the zone has been completely populated. Notably, even in examples where a zone pattern is completely populated, no multipliers are applied to the jackpot values. For example, in FIG. 7B the multiplier is not applied to the "mini" jackpot as shown in first zone pattern 502 even though first zone pattern 502 is completely populated.

After the first round of play ends, feature game play area 602 may reset for a second round of play (not shown). In particular, feature game play area 602 may reset such that only the original six prize symbols from the base game and any additional prize symbols obtained during the first round of play remain on feature game play area 602. During the second round of play, the feature game reels associated with these prize symbols do not spin. Rather, the remaining feature game reels having no prize symbols spin and stop to expose either a prize symbol or a non-prize symbol, as described above with respect to FIGS. 7 and 8. Game play progression for the feature game may continue until the player runs out of free spins or until each feature game reel displays a prize symbol (whichever occurs first). When the player runs out of free spins, game controller 202 may be configured to return the player back to the base game.

FIGS. 9-15 illustrate screenshots of various different example feature game play areas for the feature game. In particular, FIGS. 9-15 depict different types of zone patterns as well as various combinations of zone patterns and zone multipliers for the example feature game described above.

Figure 16:
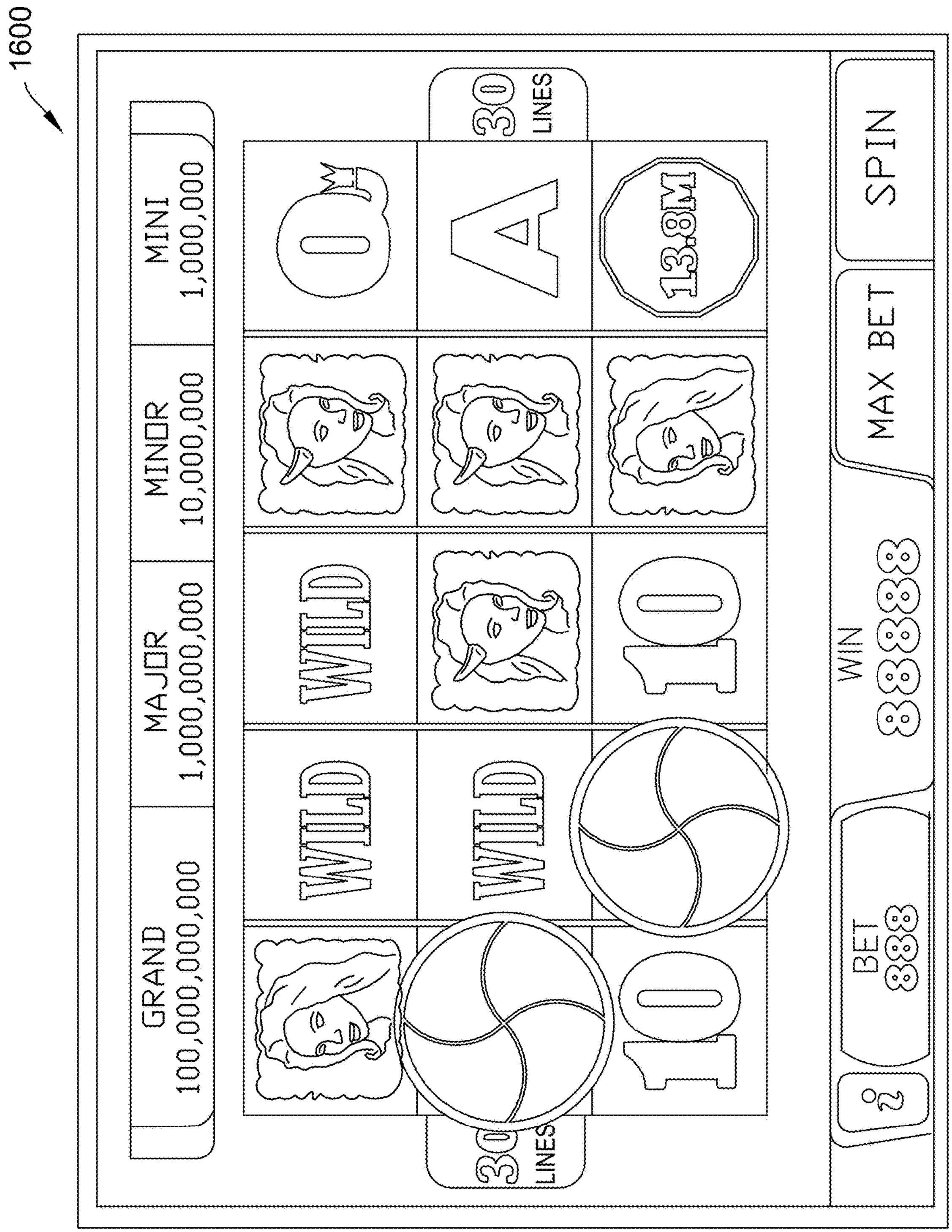
FIG. 16 is a screenshot of an example spin result on the base game play area shown at FIG. 4 after a round of play of the example base game.
Figure 17:
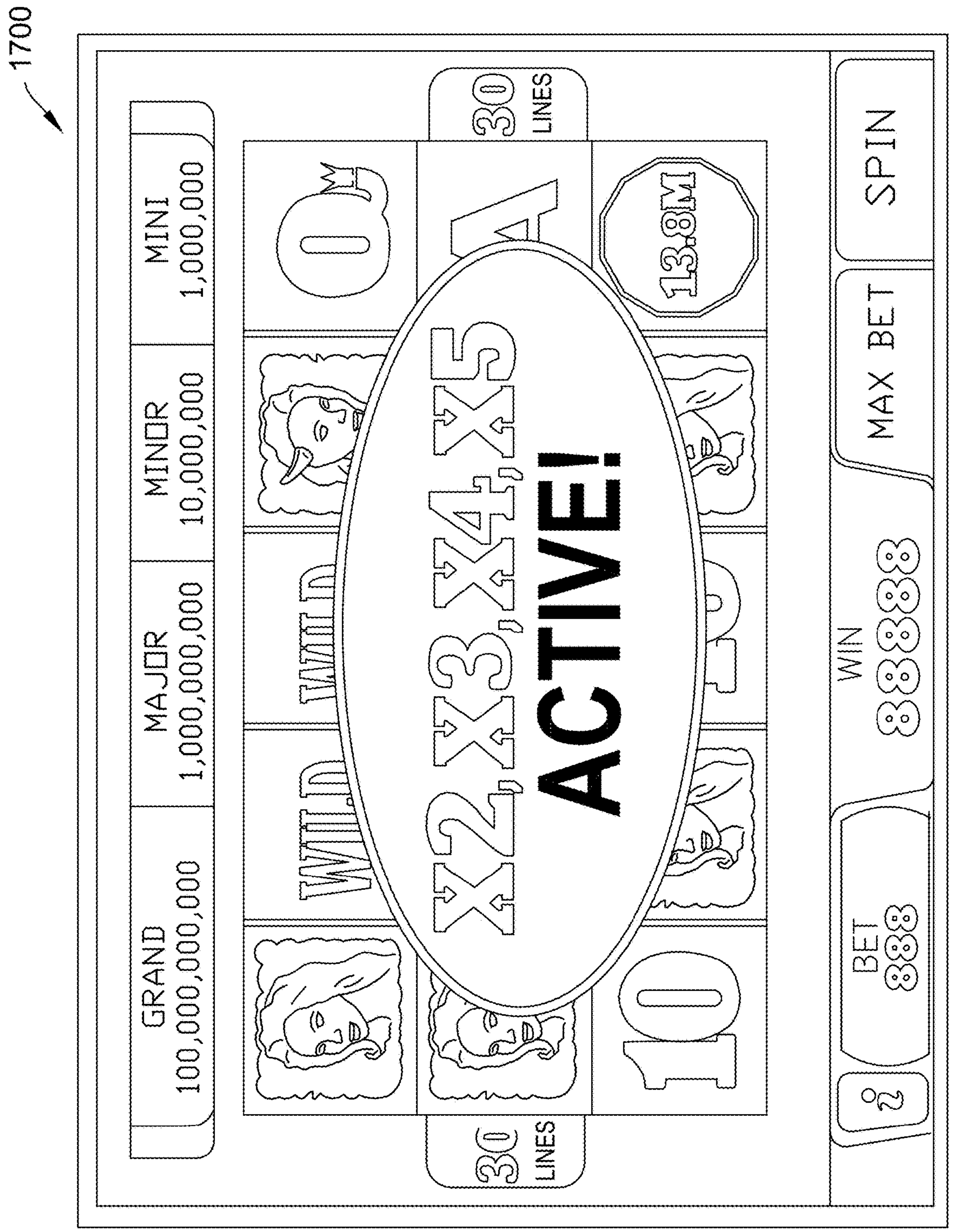
FIG. 17 is a screenshot illustrating the activation of multipliers during play of the base game.

FIG. 16 illustrates a screenshot of an example spin result on the base game play area shown at FIG. 4 after a round of play of the example base game. In some embodiments multipliers may be activated during play of the base game. In this embodiment the multipliers that may be activated during play of the base game depend on the players selected wager level, e.g. a first selected wager level may active the 2× multiplier, a second selected wager level may active the 2× and 3× multiplier, a third selected wager level may activate the 2×, 3× and 4× multiplier, and a fourth selected wager level may active the 2×, 3×, 4× and 5× multiplier. FIG. 17 illustrates a screenshot of the activation of multipliers (e.g., for a fourth wager level selected by the player) during play of the base game.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the example embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. For example, overlay 500 and the zone patterns described herein may be used for any game using a grid pattern, such as a bingo game and/or a card game. Further, although the FIGs. demonstrate grid arrangements of 3 rows by 5 columns, it should be recognized that the embodiments as described herein may be applied to a grid arrangement including any number of rows and columns. Any variation and derivation from the above description and figures are included in the scope of the present invention as defined by the claims.

What is claimed is:

1. An electronic gaming device comprising:
at least one memory with instructions stored thereon; and
at least one processor in communication with the at least one memory, wherein the instructions, when executed by the at least one processor, cause the at least one processor to:
cause display of an electronic game including a plurality of symbol positions in a game display area;
access a lookup table stored in the at least one memory, wherein the lookup table comprises a plurality of entries associated with respective configurations of zone patterns for the plurality of symbol positions;
select an entry of the plurality of entries in the lookup table based upon an output from a random number generator (RNG);
cause display of the game display area to be to be updated to include the configuration of zone patterns associated with the selected entry; and
cause the electronic game to be provided based at least in part upon the configuration of zone patterns.

2. The electronic gaming device of claim 1, wherein each zone pattern of the configuration of zone patterns is associated with a subset of the plurality of symbol positions.

3. The electronic gaming device of claim 2, wherein the instructions further cause the at least one processor to cause the electronic game to be provided based at least in part upon the configuration of zone patterns by, when a zone pattern of the configuration of zone patterns includes a symbol at each symbol position of the subset of the plurality of symbol positions associated with the zone pattern, causing a multiplier to be applied to each symbol in the zone pattern.

4. The electronic gaming device of claim 1, wherein the instructions further cause the at least one processor to determine a respective multiplier for each zone pattern of the configuration of zone patterns based at least in part upon a second output from the RNG.

5. The electronic gaming device of claim 4, wherein the instructions further cause the at least one processor to determine the respective multiplier for each zone pattern of the configuration of zone patterns based at least in part upon an input amount received for the electronic game.

6. The electronic gaming device of claim 1, wherein the electronic game is a feature game, and wherein the instructions further cause the at least one processor to cause the feature game to be provided in response to a trigger condition occurring in a base game.

7. The electronic gaming device of claim 1, wherein the instructions further cause the at least one processor to cause display of the game display area to be to be updated to include the configuration of zone patterns by causing the configuration of zone patterns to be overlaid on the plurality of symbol positions.

8. The electronic gaming device of claim 1, wherein the instructions further cause the at least one processor to cause the electronic game to be provided based at least in part upon one or more messages received from a server.

9. The electronic gaming device of claim 1, wherein the configuration of zone patterns comprises a plurality of polyomino configurations.

10. At least one non-transitory computer-readable storage medium with instructions stored thereon that, in response to execution by at least one processor, cause the at least one processor to:
cause display of an electronic game including a plurality of symbol positions in a game display area;
access a lookup table stored in the at least one non-transitory computer-readable storage medium, wherein the lookup table comprises a plurality of entries associated with respective configurations of zone patterns for the plurality of symbol positions;
select an entry of the plurality of entries in the lookup table based upon an output from a random number generator (RNG);
cause display of the game display area to be to be updated to include the configuration of zone patterns associated with the selected entry; and
cause the electronic game to be provided based at least in part upon the configuration of zone patterns.

11. The at least one non-transitory computer-readable storage medium of claim 10, wherein each zone pattern of the configuration of zone patterns is associated with a subset of the plurality of symbol positions.

12. The at least one non-transitory computer-readable storage medium of claim 11, wherein the instructions further cause the at least one processor to cause the electronic game to be provided based at least in part upon the configuration of zone patterns by, when a zone pattern of the configuration of zone patterns includes a symbol at each symbol position of the subset of the plurality of symbol positions associated with the zone pattern, causing a multiplier to be applied to each symbol in the zone pattern.

13. The at least one non-transitory computer-readable storage medium of claim 10, wherein the instructions further cause the at least one processor to determine a respective multiplier for each zone pattern of the configuration of zone patterns based at least in part upon a second output from the RNG.

14. The at least one non-transitory computer-readable storage medium of claim 13, wherein the instructions further cause the at least one processor to determine the respective multiplier for each zone pattern of the configuration of zone patterns based at least in part upon an input amount received for the electronic game.

15. The at least one non-transitory computer-readable storage medium of claim 10, wherein the electronic game is a feature game, and wherein the instructions further cause the at least one processor to cause the feature game to be provided in response to a trigger condition occurring in a base game.

16. The at least one non-transitory computer-readable storage medium of claim 10, wherein the instructions further cause the at least one processor to cause display of the game display area to be to be updated to include the configuration of zone patterns by causing the configuration of zone patterns to be overlaid on the plurality of symbol positions.

17. The at least one non-transitory computer-readable storage medium of claim 10, wherein the instructions further cause the at least one processor to at least one of cause display of the electronic game, cause display of the game display area to be updated, or cause the electronic game to be provided by transmitting one or more messages to a gaming device where the electronic game is displayed.

18. The at least one non-transitory computer-readable storage medium of claim 10, wherein the configuration of zone patterns comprises a plurality of polyomino configurations.

19. A method of electronic gaming implemented by at least one processor in communication with at least one memory, the method comprising:

causing display of an electronic game including a plurality of symbol positions in a game display area;

accessing a lookup table stored in the at least one memory, wherein the lookup table comprises a plurality of entries associated with respective configurations of zone patterns for the plurality of symbol positions;

selecting an entry of the plurality of entries in the lookup table based upon an output from a random number generator (RNG);

causing display of the game display area to be to be updated to include the configuration of zone patterns associated with the selected entry; and causing the electronic game to be provided based at least in part upon the configuration of zone patterns.

20. The method of claim 19, further comprising determining a respective multiplier for each zone pattern of the configuration of zone patterns based at least in part upon a second output from the RNG and an input amount received for the electronic game.

* * * * *